US012299566B2

(12) United States Patent
Wang et al.

(10) Patent No.: US 12,299,566 B2
(45) Date of Patent: May 13, 2025

(54) METHOD AND SYSTEM FOR RELATION LEARNING BY MULTI-HOP ATTENTION GRAPH NEURAL NETWORK

(71) Applicants: Beijing Wodong Tianjun Information Technology Co., Ltd., Beijing (CN); JD.com American Technologies Corporation, Mountain View, CA (US); The Board of Trustees of The Leland Stanford Junior University, Stanford, CA (US)

(72) Inventors: Guangtao Wang, Cupertino, CA (US); Zhitao Ying, Palo Alto, CA (US); Jing Huang, Mountain View, CA (US); Jurij Leskovec, Stanford, CA (US)

(73) Assignees: Beijing Wodong Tianjun Information Technology Co., Ltd., Beijing (CN); JD.com American Technologies Corporation, Mountain View, CA (US); The Board of Trustees of The Leland Stanford Junior University, Stanford, CA (US)

(*) Notice: Subject to any disclaimer, the term of this patent is extended or adjusted under 35 U.S.C. 154(b) by 1025 days.

(21) Appl. No.: 17/327,867

(22) Filed: May 24, 2021

(65) Prior Publication Data

US 2022/0092413 A1 Mar. 24, 2022

Related U.S. Application Data

(60) Provisional application No. 63/082,096, filed on Sep. 23, 2020.

(51) Int. Cl.
*G06N 3/08* (2023.01)
*G06N 3/042* (2023.01)
*G06N 3/10* (2006.01)

(52) U.S. Cl.
CPC ............. *G06N 3/08* (2013.01); *G06N 3/042* (2023.01); *G06N 3/10* (2013.01)

(58) Field of Classification Search
None
See application file for complete search history.

(56) References Cited

U.S. PATENT DOCUMENTS

2019/0122145 A1* 4/2019 Sun .................... G06N 20/00
2019/0362246 A1* 11/2019 Lin .................... G06F 16/9024
(Continued)

FOREIGN PATENT DOCUMENTS

| CN | 110196928 A | 9/2019 |
|---|---|---|
| CN | 111259142 A | 6/2020 |

(Continued)

OTHER PUBLICATIONS

"Multi-hop Hierarchical Graph Neural Networks", https://ieeexplore.ieee.org/document/9070753, Xue et al, Apr. 20, 2020, 14 pages (Year: 2020).*

(Continued)

*Primary Examiner* — Haimei Jiang
(74) *Attorney, Agent, or Firm* — Scully, Scott, Murphy & Presser, P.C.

(57) ABSTRACT

System and method for completing knowledge graph. The system includes a computing device, the computing device has a processor and a storage device storing computer executable code. The computer executable code is configured to: provide an incomplete knowledge graph comprising a plurality of nodes and a plurality of edges, each of the edges connecting two of the plurality of nodes; calculate an attention matrix of the incomplete knowledge graph based on one-hop attention between any two of the plurality of the nodes that are connected by one of the plurality of the edges; calculate multi-head diffusion attention for any two of the (Continued)

plurality of nodes from the attention matrix; obtain updated embedding of the incomplete knowledge graph using the multi-head diffusion attention; and update the incomplete knowledge graph to obtain updated knowledge graph based on the updated embedding.

17 Claims, 10 Drawing Sheets

(56) References Cited

U.S. PATENT DOCUMENTS

| | | | |
|---|---|---|---|
| 2020/0104729 A1 | 4/2020 | Busbridge et al. | |
| 2020/0193245 A1 | 6/2020 | Divakaran et al. | |
| 2020/0226472 A1 | 7/2020 | Shanthamallu et al. | |
| 2020/0285944 A1* | 9/2020 | Lee | G06F 16/9024 |
| 2021/0050033 A1* | 2/2021 | Bui | G06F 17/16 |
| 2021/0406669 A1* | 12/2021 | Yu | G06N 3/044 |

FOREIGN PATENT DOCUMENTS

| | | |
|---|---|---|
| JP | 2020-68000 A | 4/2020 |
| JP | 2020087127 A | 6/2020 |

OTHER PUBLICATIONS

Chenyi Zhuang, Qiang Ma, Dual graph convolutional networks for graph-based semi-supervised classification, Track: Social Network Analysis and Graph Algorithms for the Web, 2018.
Jimmy Lei Ba, Jamie Ryan Kiros, Geoffrey E. Hinton, Layer Normalization, 2016, arXiv:1607.06450.
Dzmitry Bahdanau, Kyunghyun Cho, Yoshua Bengio, Neural Machine Translation by Jointly Learning to Align and Translate, ICLR, 2015, arXiv:1409.0473.
Ivana Balazevic, Carl Allen, Timothy Hospedales, TuckER: Tensor Factorization for Knowledge Graph Completion, EMNLP-IJCNLP, 2019, 5185-5194.
Trapit Bansal, Da-Cheng Juan, Sujith Ravi, Andrew McCallum, A2N: Attending to Neighbors for Knowledge Graph Inference, Proceedings of the 57th Annual Meeting of the Association for Computational Linguistics (ACL), 2019, 4387-4392.
Peter W. Battaglia, Jessica B. Hamrick, Victor Bapst, et. al., Relational inductive biases, deep learning, and graph networks, 2018, arXiv:1806.01261.
Antoine Bordes, Nicolas Usunier, Alberto Garcia-Duran, Jason Weston, Oksana Yakhnenko, Translating Embeddings for Modeling Multi-relational Data, Advances in Neural Information Processing Systems 26 (NIPS 2013).
Ines Chami, Adva Wolf, Da-Cheng Juan, Frederic Sala, Sujith Ravi, Christopher Ré, Low-Dimensional Hyperbolic Knowledge Graph Embeddings, Proceedings of the 58th Annual Meeting of the Association for Computational Linguistics (ACL), 2020, 6901-6914.
Michaël Defferrard, Xavier Bresson, Pierre Vandergheynst, Convolutional neural networks on graphs with fast localized spectrrail filtering, NIPS'16: Proceedings of the 30th International Conference on Neural Information Processing, 2016, 3844-3852.
T Dettmers, Pasquale Minervini, P Stenetorp, Sebastian Riedel, Convolutional 2D knowledge graph embeddings, Conference: 32nd AAAI Conference on Artificial Intelligence (AAAI-18), 2018, 32.
Jacob Devlin, Ming-Wei Chang, Kenton Lee, Kristina Toutanova, BERT: Pre-training of Deep Bidirectional Transformers for Language Understanding, Proceedings of NAACL-HLT 2019, 2019, 4171-4186.
Hongyang Gao, Shuiwang Ji, Graph U-Nets, 2019, arXiv:1905.05178.
Hongyang Gao, Zhengyang Wang, Shuiwang Ji, Large-Scale Learnable Graph Convolutional Networks, Proceedings of the 24th ACM SIGKDD International Conference on Knowledge Discovery & Data Mining, 2018, 1416-1424.

Aditya Grover, Jure Leskovec, node2vec: Scalable Feature Learning for Networks, KDD '16: Proceedings of the 22nd ACM SIGKDD International Conference on Knowledge Discovery and Data Mining, 2016, 855-864.
Elvin Isufi, Fernando Gama, Alejandro Ribeiro, EdgeNets:Edge Varying Graph Neural Networks, 2020, arXiv:2001.07620.
Kipf, Thomas N.; Welling, Max, Semi-Supervised Classification with Graph Convolutional Networks, 2017, arXiv:1609.02907.
Johannes Klicpera, Aleksandar Bojchevski, Stephan Günnemann, Predict then Propagate: Graph Neural Networks meet Personalized PageRank, ICLR, 2019.
Johannes Klicpera, Stefan Weißenberger, Stephan Günnemann, Diffusion Improves Graph Learning, Advances in Neural Information Processing Systems 32 (NeurIPS 2019).
Zhenzhong Lan, Mingda Chen, Sebastian Goodman, Kevin Gimpel, Piyush Sharma, Radu Soricut, ALBERT: A Lite BERT for Self-supervised Learning of Language Representations, ICLR 2020 Conference, 2020.
Qimai Li, Zhichao Han, Xiao-Ming Wu, Deeper Insights Into Graph Convolutional Networks for Semi-Supervised Learning, AAAI 2018, 3538-3545.
Renjie Liao, Zhizhen Zhao, Raquel Urtasun, Richard Zemel, LanczosNet: Multi-Scale Deep Graph Convolutional Networks, ICLR 2019 Conference, 2019.
Yinhan Liu, Myle Ott, Naman Goyal, et al., RoBERTa: A Robustly Optimized BERT Pretraining Approach, 2019, arXiv:1907.11692.
Ziqi Liu, Chaochao Chen, Longfei Li, Jun Zhou, Xiaolong Li, Le Song, Yuan Qi, GeniePath: Graph Neural Networks with Adaptive Receptive Paths, AAAI Technical Track: Machine Learning, 2019, 33(01):4424-4431.
Peter Lofgren, Efficient Algorithms for Personalized Pagerank, PHD Thesis, Stanford University, 2015.
Sitao Luan, Mingde Zhao, Xiao-Wen Chang, Doina Precup, Break the Ceiling: Stronger Multi-scale Deep Graph Convolutional Networks, Advances in Neural Information Processing Systems 32 (NeurIPS 2019), 2019.
Andrew Ng, Michael Jordan, Yair Weiss, on Spectral Clustering: Analysis and an algorithm, dvances in Neural Information Processing Systems 14 (NIPS 2001).
Kenta Oono, Taiji Suziku, Graph neural networks exponentially lose expressive power for node classification, ICLR 2020.
Pinkus, Allan, Approximation theory of the MLP model in neural networks, Acta Numerica, 1999, 8:143-195.
Alec Radford, Jeffrey Wu, R. Child, David Luan, Dario Amodei, Ilya Sutskever, Language Models are Unsupervised Multitask Learners, OpenAI, 2019.
Aliaksei Sandryhaila; José M. F. Moura, Discrete signal processing on graphs: Graph fourier transform, 2012, arXiv:1210.4752.
Michael Schlichtkrull, Thomas N. Kipf, Peter Bloem, Rianne van den Berg, Ivan Titov, Max Welling, Modeling Relational Data with Graph Convolutional Networks, 2017, arXiv:1703.06103.
Prithviraj Sen, Galileo Namata, Mustafa Bilgic, Lise Getoor, Brian Galligher, Tina Eliassi-Rad, Collective Classification in Network Data, AI Magazine, 2008, 29(3), 93.
Chao Shang, Yun Tang, Jing Huang, Jinbo Bi, Xiaodong He, Bowen Zhou, End-to-end Structure-Aware Convolutional Networks for Knowledge Base Completion, 2018, arXiv:1811.04441.
Uday Shankar Shanthamallu, Jayaraman J. Thiagarajan, Andreas Spanias, A Regularized Attention Mechanism for Graph Attention Networks, 2020, arXiv:1811.00181.
Zhiqing Sun, Zhi-Hong Deng, Jian-Yun Nie, Jian Tang, RotatE: Knowledge Graph Embedding by Relational Rotation in Complex Space, ICLR 2019 Conference, 2019.
Yun Tang, Jing Huang, Guangtao Wang, Xiaodong He, Bowen Zhou, Orthogonal Relation Transforms with Graph Context Modeling for Knowledge Graph Embedding, Proceedings of the 58th Annual Meeting of the Association for Computational Linguistics (ACL), 2020, 2713-2722.
Kiran K. Thekumparampil, Chong Wang, Sewoong Oh, Li-Jia Li, Attention-based Graph Neural Network for Semi-supervised Learning, 2018, arXiv:1803.03735.

(56) References Cited

OTHER PUBLICATIONS

Kristina Toutanova, Danqi Chen, Observed Versus Latent Features for Knowledge Base and Text Inference, The 3rd Workshop on Continuous Vector Space Models and their Compositionality.
Théo Trouillon, Johannes Welbl, Sebastian Riedel, Éric Gaussier, Guillaume Bouchard, Complex embeddings for simple link prediction, ICML'16: Proceedings of the 33rd International Conference on International Conference on Machine Learning, 2016, 48:2071-2080.
Ashish Vaswani, Noam Shazeer, Niki Parmar, Jakob Uszkoreit, Llion Jones, Aidan N. Gomez, Łukasz Kaiser, Illia Polosukhin, Attention is All you Need, Advances in Neural Information Processing Systems 30 (NIPS 2017), 2017.
Petar Veličković, Guillem Cucurull, Arantxa Casanova, Adriana Romero, Pietro Liò, Yoshua Bengio, Graph Attention Networks, ICLR 2018 Conference, 2018.
Guangtao Wang, Rex Ying, Jing Huang, Jure Leskovec, Improving Graph Attention Networks with Large Margin-based Constraints, 2019, arXiv:1910.11945.
Quan Wang, Pingping Huang, Haifeng Wang, Songtai Dai, Wenbin Jiang, Jing Liu, Yajuan Lyu, Yong Zhu, Hua Wu, CoKE: Contextualized Knowledge Graph Embedding, 2020, arXiv:1911.02168.
Weihua Hu, Matthias Fey, Marinka Zitnik, Yuxiao Dong, Hongyu Ren, Bowen Liu, Michele Catasta, Jure Leskovec, Open Graph Benchmark: Datasets for Machine Learning on Graphs, 2021, arXiv:2005.00687.
Zonghan Wu; Shirui Pan; Fengwen Chen; Guodong Long; Chengqi Zhang; Philip S. Yu, A Comprehensive Survey on Graph Neural Networks, 2019, arXiv:1901.00596.
Louis-Pascal A. C. Xhonneux, Meng Qu, Jian Tang, Continuous Graph Neural Networks, 2020, arXiv:1912.00967.
Ruibin Xiong, Yunchang Yang, Di He, Kai Zheng, Shuxin Zheng, Huishuai Zhang, Yanyan Lan, Liwei Wang, Tie-Yan Liu, on Layer Normalization in the Transformer Architecture, ICLR 2020 Conference, 2020.
Keyulu Xu, Chengtao Li, Yonglong Tian, Tomohiro Sonobe, Kenichi Kawarabayashi, Stefanie Jegelka, Representation Learning on Graphs with Jumping Knowledge Networks, 2018, arXiv:1806.03536.
Bishan Yang, Wen-tau Yih, Xiaodong He, Jianfeng Gao, Li Deng, Embedding Entities and Relations for Learning and Inference in Knowledge Bases, 2015, arXiv:1412.6575.
Jiani Zhang, Xingjian Shi, Junyuan Xie, Hao Ma, Irwin King, Dit-Yan Yeung, GaAN: Gated Attention Networks for Learning on Large and Spatiotemporal Graphs, a2018, rXiv:1803.07294.
Shuai Zhang, Yi Tay, Lina Yao, Qi Liu, Quaternion Knowledge Graph Embeddings, NeurIPS 2019.
PCT/CN2021/119792, International Search Report and the Written Opinion, International Searching Authority, Dec. 9, 2021.
Suzuki S. et al., "Argument Component Classification with Graph Attention Network", Information Processing Society of Japan, Report of Research, Natural Language Processing (Nl), 2020-NL-244, Japan, Information Processing Society of Japan, 2020, 1-8 pages, together with an English-language abstract (cited in JP Notice of Reasons for Rejection).
Japanese Notice of Reasons for Rejection dated Mar. 5, 2024 received in Japanese Patent Application No. 2023-515590, together with an English-language translation.
Extended European Search Report dated Sep. 11, 2024 received in EP Patent Application No. 21871520.9, 7 pages.
Feng, C., et al., "Attention Based Convolutional Network for Recommendation System", ICASSP 2019, May 12, 2019, pp. 7560-7564.
Tu, M., et al., "Multi-hop Reading Comprehension across Multiple Documents by Reasoning over Heterogeneous Graphs", arXiv:1905.07374v2, Jun. 4, 2019, pp. 1-10.
Wang, G., et al., "Direct Multi-hop Attention Based Graph Neural Networks", arXiv:2009.14332v1, Sep. 29, 2020, 15 pages.

* cited by examiner

Table 1

| | Models | Cora | Citeseer | Pubmed |
|---|---|---|---|---|
| Baselines | GCNs (Kipf & Welling, 2016) | 81.5 | 70.3 | 79.0 |
| | Chebyshev (Defferrard et al., 2016) | 81.2 | 69.8 | 74.4 |
| | DualGCN (Zhuang & Ma, 2018) | 83.5 | 72.6 | 80.0 |
| | JKNet (Xu et al., 2018) | 81.1 | 69.8 | 78.1 |
| | LGCN (Gao et al., 2018) | 83.3 ± 0.5 | 73.0 ± 0.6 | 79.5 ± 0.2 |
| | Diffusion-GCN (Klicpera et al., NeurIPS, 2019) | 83.6 ± 0.2 | 73.4 ± 0.3 | 79.6 ± 0.4 |
| | APPNP (Klicpera et al., ICLR, 2019) | 84.3 ± 0.2 | 71.1 ± 0.4 | 79.7 ± 0.3 |
| | Graph U-Nets (g-U-Nets) (Gao & Ji, 2019) | 84.4 ± 0.6 | 73.2 ± 0.5 | 79.6 ± 0.2 |
| | GAT (Velickovic et al., 2018) | 83.0 ± 0.7 | 72.5 ± 0.7 | 79.0 ± 0.3 |
| Abl. | No LayerNorm | 83.8 ± 0.6 | 71.1 ± 0.5 | 79.8 ± 0.2 |
| | No Diffusion | 83.0 ± 0.4 | 71.6 ± 0.4 | 79.3 ± 0.3 |
| | No Feed-Forward | 84.9 ± 0.4 | 72.2 ± 0.3 | 80.9 ± 0.3 |
| | No (LayerNorm + Feed-Forward) | 84.3 ± 0.6 | 72.6 ± 0.4 | 79.6 ± 0.4 |
| | MAGNA | 85.4 ± 0.6 | 73.7 ± 0.5 | 81.4 ± 0.2 |

FIG. 6

Table 2

| Data | GCN (Kipf & Welling, 2016) | GraphSAGE (Hamilton et al., 2017) | Node2vec (Grover & Leskovec, 2016) | JKNet (Xu et al., 2018) | GaAN (Zhang et al., 2018) | MLP | MAGNA |
|---|---|---|---|---|---|---|---|
| ogbn-arxiv | 71.74±0.29 | 71.49±0.27 | 70.07±0.13 | 72.19±0.21 | 71.97±0.24 | 55.50±0.23 | 72.76±0.14 |

FIG. 7

Table 3

| Models | WN18RR | | | | | FB15k-237 | | | | |
|---|---|---|---|---|---|---|---|---|---|---|
| | MR | MRR | H@1 | H@3 | H@10 | MR | MRR | H@1 | H@3 | H@10 |
| TransE (Bordes et al., 2013) | 3384 | 0.226 | - | - | 0.501 | 357 | 0.294 | - | - | 0.465 |
| RotatE (Sun et al., 2019) | 3340 | 0.476 | 0.428 | 0.492 | 0.571 | 177 | 0.338 | 0.241 | 0.375 | 0.533 |
| OTE (Tang et al., 2020) | - | 0.491 | 0.442 | 0.511 | 0.583 | - | 0.361 | 0.267 | 0.396 | 0.55 |
| ROTH (Chami et al., 2020) | - | 0.496 | 0.449 | 0.514 | 0.586 | - | 0.344 | 0.246 | 0.38 | 0.535 |
| ComplEx (Trouillon et al., 2016) | 5261 | 0.44 | 0.41 | 0.46 | 0.51 | 339 | 0.247 | 0.158 | 0.275 | 0.428 |
| QuatE (Zhang et al., 2019) | 2314 | 0.488 | 0.438 | 0.508 | 0.582 | - | 0.366 | 0.271 | 0.401 | 0.556 |
| CoKE (Wang et al., 2019b) | - | 0.475 | 0.437 | 0.490 | 0.552 | - | 0.361 | 0.269 | 0.398 | 0.547 |
| ConvE (Dettmers et al., 2018) | 4187 | 0.43 | 0.4 | 0.44 | 0.52 | 244 | 0.325 | 0.237 | 0.356 | 0.501 |
| DistMult (Yang et al., 2015) | 5110 | 0.43 | 0.39 | 0.44 | 0.49 | 254 | 0.241 | 0.155 | 0.263 | 0.419 |
| TuckER (Balazevic et al., 2019) | - | 0.47 | 0.443 | 0.482 | 0.526 | - | 0.358 | 0.266 | 0.392 | 0.544 |
| R-GCN (Schlichtkrull et al., 2018) | - | - | - | - | - | - | 0.249 | 0.151 | 0.264 | 0.417 |
| SACN (Shang et al., 2019) | - | 0.47 | 0.43 | 0.48 | 0.54 | - | 0.35 | 0.26 | 0.39 | 0.54 |
| A2N (Bansal et al., 2019) | - | 0.45 | 0.42 | 0.46 | 0.51 | - | 0.317 | 0.232 | 0.348 | 0.486 |
| MAGNA+DistMult | 2545 | 0.502 | 0.459 | 0.519 | 0.589 | 138 | 0.369 | 0.275 | 0.409 | 0.563 |

FIG. 8

METHOD AND SYSTEM FOR RELATION LEARNING BY MULTI-HOP ATTENTION GRAPH NEURAL NETWORK

CROSS-REFERENCES

This application claims priority to and the benefit of, pursuant to 35 U.S.C. § 119(e), U.S. provisional patent application Ser. No. 63/082,096, filed Sep. 23, 2020, titled "METHOD AND SYSTEM FOR REPRESENTATION LEARNING ON RELATION STRUCTURE BY GRAPH DIFFUSION TRANSFORMER" by Guangtao Wang, Zhitao Ying, Jing Huang, and Jurij Leskovec, which is incorporated herein in its entirety by reference. Kindly note that the graph diffusion transformer in the above provisional application is equivalent to multi-hop attention graph neural network (MAGNA) discussed in this disclosure.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entirety and to the same extent as if each reference were individually incorporated by reference.

FIELD OF THE DISCLOSURE

The present disclosure relates generally to relation learning, and more specifically related to methods and systems for graph representation learning using MAGNA.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The introduction of the self-attention mechanism has pushed the state-of-the-art in many domains including graph presentation learning. Graph Attention Network (GAT) and related models developed attention mechanism for Graph Neural Networks (GNNs), which compute attention scores between nodes connected by an edge, allowing the model to attend to messages of node's direct neighbors according to their attention scores.

However, such attention mechanism does not account for nodes that are not directly connected but provide important network context. Therefore, an unaddressed need exists in the art to address the aforementioned deficiencies and inadequacies.

SUMMARY OF THE DISCLOSURE

In certain aspects, the present disclosure relates to a system. In certain embodiments, the system includes a computing device, and the computing device has a processer and a storage device storing computer executable code. The computer executable code, when executed at the processor, is configured to:

provide an incomplete knowledge graph comprising a plurality of nodes and a plurality of edges, each of the edges connecting two of the plurality of nodes;

calculate an attention matrix of the incomplete knowledge graph based on one-hop attention between any two of the plurality of the nodes that are connected by one of the plurality of the edges;

calculate multi-head diffusion attention for any two of the plurality of nodes from the attention matrix;

obtain updated embedding of the incomplete knowledge graph using the multi-head diffusion attention; and update the incomplete knowledge graph to obtain updated knowledge graph based on the updated embedding.

In certain embodiments, the computer executable code is configured to calculate the attention matrix by:

calculating an attention score $s_{i,k,j}^{(l)}$ for an edge $(v_i, r_k, v_j)$ by $s_{i,k,j}^{(l)} = \text{LeakyReLU}(v_\alpha^{(l)} \tan h(W_h^{(l)} h_i^{(l)} \| W_t^{(l)} h_j^{(l)} \| W_r^{(l)} r_k))$ (equation (1)), wherein $v_i$ and $v_j$ are nodes i and j, $r_k$ is a type of the edge between the nodes i and j, $W_h^{(l)} \in \mathbb{R}^{d^{(l)} \times d^{(l)}}$, $W_t^{(l)} \in \mathbb{R}^{d^{(l)} \times d^{(l)}}$, $W_r^{(l)} \in \mathbb{R}^{d^{(l)} \times d_r}$ and $v_\alpha^{(l)} \in \mathbb{R}^{1 \times 3d^{(l)}}$ are trainable weights shared by an l-th layer of the multi-head attention, $h_i^{(l)} \in \mathbb{R}^{d^{(l)}}$ represents embedding of the node i at the l-th layer, $h_j^{(l)} \in \mathbb{R}^{d^{(l)}}$ represents embedding of the node j at the l-th layer, $r_k$ is trainable relation embedding of a k-th relation type, and $\|$ denotes concatenation of embedding vectors;

obtaining attention score matrix $S^{(l)}$ by:

$$S_{i,j}^{(l)} = \begin{cases} s_{i,k,j}^{(l)}, & \text{if } (v_i, r_k, v_j) \\ -\infty, & \text{otherwise} \end{cases}$$

appears in $\mathcal{G}$ (equation (2)), wherein $\mathcal{G}$ is the knowledge graph; and calculating the attention matrix $A^{(l)}$ by: $A^{(l)} = \text{softmax}(S^{(l)})$.

In certain embodiments, the computer executable code is configured to calculate the multi-head diffusion attention by:

calculating multi-hop attention matrix $\mathcal{A}$ by: $\mathcal{A} = \sum_{hop=0}^{\infty} \theta_{hop} A^{hop}$ (equation (3)), wherein hop is a positive integer in a range of 2-20, and $\theta_{hop}$ is an attention decay factor; and calculating the multi-head diffusion attention by: AttDiffusion($\mathcal{G}$, $H^{(l)}$, $\Theta$) = $\mathcal{A} H^{(l)}$ (equation (4)), wherein $\Theta$ represents parameters for equation (1), and $H^{(l)}$ is input entity embedding of the l-th layer.

In certain embodiments, the $\mathcal{A} H^{(l)}$ is approximated by: letting $Z^{(0)} = H^{(l)}$, $Z^{(k+1)} = (1-\alpha) AZ^{(k)} + \alpha Z^{(0)}$ (equation (5)), wherein $0 \leq k \leq K$, and $\theta_{hop} = \alpha(1-\alpha)^{hop}$; and defining the $\mathcal{A} H^{(l)}$ as $Z^{(K)}$.

In certain embodiments, the hop is equivalent to K, and the hop and the K is a positive integer in a range of 2-12. In certain embodiments, the hop and the K is in a range of 3-10. In certain embodiments, the hop and the K is 6, 7, or 8. In certain embodiments, l is a positive integer in a range of 2-24. In certain embodiments, l is 3, 6, 12, 18, or 24. In certain embodiments, l is 3, 6 or 12.

In certain embodiments, the computer executable code is configured to obtain the updated embedding of the incomplete knowledge graph by: performing sequentially a first layer normalization and addition, a feed forward, and a second layer normalization and addition on the multi-head diffusion attention.

In certain embodiments, the feed forward is performed using a two-layer feed forward network. The two layer feed forward network may be a two-layer multiplayer perceptron (MLP).

In certain embodiments, the computer executable code is further configured to, after obtaining updated embedding: calculate a loss function based on the updated embedding and labels of the nodes and edges of the incomplete knowledge, and adjust parameters for calculating the attention matrix, calculating the multi-head diffusion attention, and obtaining the updated embedding.

In certain embodiments, the computer executable code is configured to perform the steps of calculating the attention matrix, calculating the multi-head attention diffusion, obtaining the updated embedding, calculating the loss function, and adjusting the parameters iteratively for a plurality of times, and update the incomplete knowledge graph using the updated embedding obtained after the plurality of times of iterations.

In certain embodiments, the computer executable code is configured to update the incomplete knowledge graph by: predict new feature of the plurality of the nodes or predict new edges based on the updated embedding, and adding the new features to the nodes or adding the new edges to the incomplete knowledge graph.

In certain embodiments, the computer executable code is further configured to, when the updated knowledge graph comprises a plurality of consumers and a plurality of products: recommend a product to a consumer when the product and the consumer is linked by an edge in the updated knowledge graph, and the edge indicates interest of the consumer to the product.

In certain embodiments, the computer executable code is further configured to, when the updated knowledge graph comprises a plurality of customers: provide credit scores for the plurality of customers based on features of the customers in the knowledge graph.

In certain aspects, the present disclosure relates to a method. In certain embodiments, the method includes:
  providing, by a computing device, an incomplete knowledge graph comprising a plurality of nodes and a plurality of edges, each of the edges connecting two of the plurality of nodes;
  calculating, by the computing device, an attention matrix of the incomplete knowledge graph based on one-hop attention between any two of the plurality of the nodes that are connected by one of the plurality of the edges;
  calculating, by the computing device, multi-head diffusion attention for any two of the plurality of nodes from the attention matrix;
  obtaining, by the computing device, updated embedding of the incomplete knowledge graph using the multi-head diffusion attention; and
  updating, by the computing device, the incomplete knowledge graph to obtain updated knowledge graph based on the updated embedding.

In certain embodiments, the step of calculating the attention matrix comprises:
  calculating an attention score $s_{i,k,j}^{(l)}$ for an edge $(v_i, r_k, v_j)$ by $s_{i,k,j}^{(l)} = \text{LeakyReLU}(v_\alpha^{(l)} \tan h(W_h^{(l)} h_i^{(l)} \| W_t^{(l)} h_j^{(l)} \| W_r^{(l)} r_k))$ (equation (1)), wherein $v_i$ and $v_j$ are nodes i and j, $r_k$ is a type of the edge between the nodes i and j, $W_h^{(l)} \in \mathbb{R}^{d^{(l)} \times d^{(l)}}$, $W_t^{(l)} \in \mathbb{R}^{d^{(l)} \times d^{(l)}}$, $W_r^{(l)} \in \mathbb{R}^{d^{(l)} \times d_r}$ and $v_\alpha^{(l)} \in \mathbb{R}^{1 \times 3 d^{(l)}}$ are trainable weights shared by an l-th layer of the multi-head attention, $h_i^{(l)} \in \mathbb{R}^{d^{(l)}}$ represents embedding of the node i at the l-th layer, $h_j^{(l)} \in \mathbb{R}^{d^{(l)}}$ represents embedding of the node j at the l-th layer, $r_k$ is trainable relation embedding of a k-th relation type, and $\|$ denotes concatenation of embedding vectors;
  obtaining attention score matrix $S^{(l)}$ by:

$$S_{i,j}^{(l)} = \begin{cases} s_{i,k,j}^{(l)}, & \text{if } (v_i, r_k, v_j) \\ -\infty, & \text{otherwise} \end{cases}$$

appears in $\mathcal{G}$ (equation (2)), wherein $\mathcal{G}$ is the knowledge graph; and
  calculating the attention matrix $A^{(l)}$ by: $A^{(l)} = \text{softmax}(S^{(l)})$.

In certain embodiments, the step of calculating the multi-head diffusion attention comprises:
  calculating multi-hop attention matrix $\mathcal{A}$ by: $\mathcal{A} = \Sigma_{hop=0}^{\infty} \theta_{hop} A^{hop}$ (equation (3)), wherein hop is a positive integer in a range of 2-12, and $\theta_{hop}$ is an attention decay factor; and
  calculating the multi-head diffusion attention by: AttDiffusion($\mathcal{G}$, $H^{(l)}$, $\Theta$) = $\mathcal{A} H^{(l)}$ (equation (4)), wherein $\Theta$ represents parameters for equation (1), and $H^{(l)}$ is input entity embedding of the l-th layer.

In certain embodiments, the $\mathcal{A} H^{(l)}$ is approximated by: letting $Z^{(0)} = H^{(l)}$, $Z^{(k+1)} = (1-\alpha) A Z^{(k)} + \alpha Z^{(0)}$ (equation (5)), wherein $0 \leq k \leq K$, and $\theta_{hop} = \alpha(1-\alpha)^{hop}$; and
  defining the $\mathcal{A} H^{(l)}$ as $Z^{(K)}$.

In certain embodiments, the hop is equivalent to K, and the hop and the K is a positive integer in a range of 2-12. In certain embodiments, the hop and the K is in a range of 3-10. In certain embodiments, the hop and the K is 6, 7, or 8. In certain embodiments, l is a positive integer in a range of 2-24. In certain embodiments, l is 3, 6, 12, 18, or 24. In certain embodiments, l is 3, 6 or 12.

In certain embodiments, the computer executable code is configured to obtain the updated embedding of the incomplete knowledge graph by: performing sequentially a first layer normalization and addition, a feed forward, and a second layer normalization and addition on the multi-head diffusion attention.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 6, Table 1 shows node classification accuracy on Cora, Citeseer, Pubmed using MAGNA and other related method according to certain embodiments of the present disclosure.

FIG. 7, Table 2 shows node classification accuracy on OGB Arxiv dataset using MAGNA and other related methods according to certain embodiments of the present disclosure.

FIG. 8, Table 3 shows knowledge completion on WN18PR and FB15k-237 by MAGNA and other related methods according to certain embodiments of the present disclosure.

DETAILED DESCRIPTION

Figure 1B:
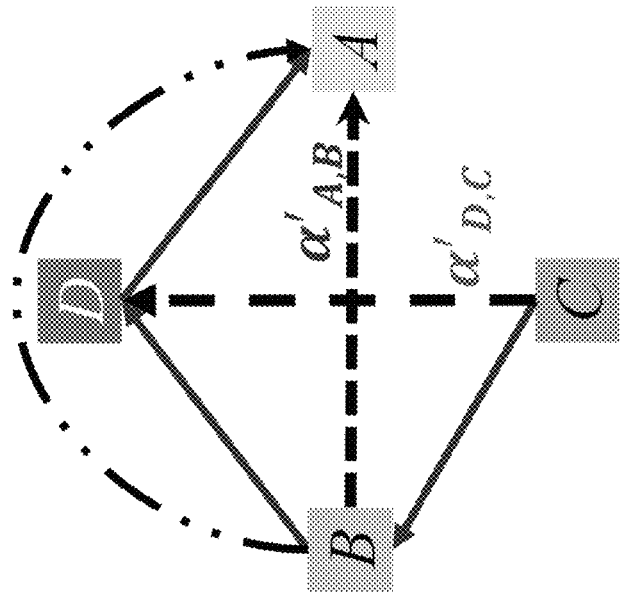
FIG. 1B schematically depicts computation of self-attention weights between disconnected pairs of nodes through an attention diffusion process using the attention weights on the edges according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a" "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Introduction to Multi-Hop Graph Neural Network (MAGNA)

In certain aspects, the present disclosure provides a Multi-hop Attention Graph Neural Network (MAGNA) to incorporate multi-hop context information into attention computation, enabling long-range interactions at every layer of the GNN. In certain embodiments, to compute attention between nodes that are not directly connected, MAGNA diffuses the attention scores across the network, which increases the "receptive field" for every layer of the GNN. Unlike previous approaches, MAGNA uses a diffusion prior on attention values, to efficiently account for all paths between the pair of disconnected nodes. This helps MAGNA capture large-scale structural information in every layer, and learn more informative attention. Experimental results on node classification as well as knowledge graph completion benchmarks show that MAGNA achieves state-of-the-art results: MAGNA achieves up to 5:7% relative error reduction over the previous state-of-the-art on Cora, Citeseer, and Pubmed. MAGNA also obtains the best performance on a large-scale Open Graph Benchmark dataset. On knowledge graph completion, MAGNA advances state-of-the-art on WN18RR and FB15k-237 across four different performance metrics.

Figure 1A:
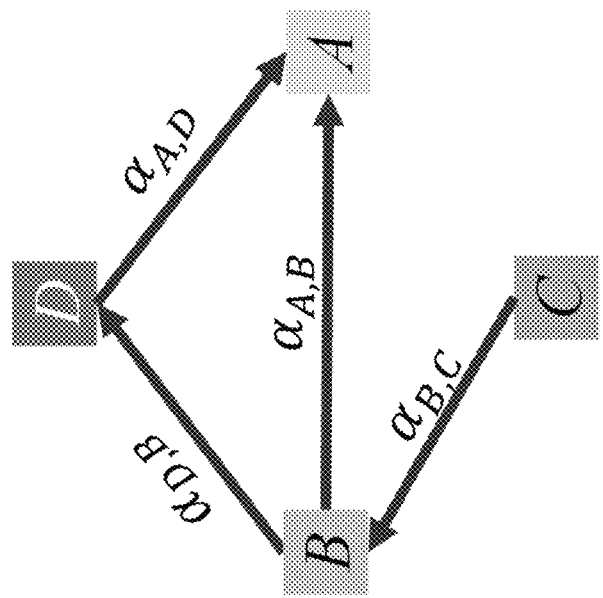
FIG. 1A schematically depicts computation of attention weights on edges according to certain embodiments of the present disclosure.

FIG. 1A schematically depicts computation of attention weights on edges, and FIG. 1B schematically depicts computation of self-attention weights between disconnected pairs of nodes through an attention diffusion process using the attention weights on the edges according to certain embodiments of the present disclosure. As shown in FIG. 1A, a knowledge graph includes nodes A, B, C, and D, attention weight $\alpha_{A,B}$ for the edge from node B to node A, attention weight $\alpha_{B,C}$ for the edge from node C to node B, attention weight $\alpha_{A,D}$ for the edge from node D to node A, and attention weight $\alpha_{D,B}$ for the edge from node B to node D. The attention weight $\alpha_{A,B}$ indicates the importance of node B's feature to node A in the graph, and is calculated by $\alpha_{A,B}=g(v_A, v_B)$, which is only related to the node representations $v_A$ and $v_B$ of node A and node B. Accordingly, because there is no direct edge relation between node C and D, $\alpha_{D,C}=0$, i.e., there is no effect of node C to node D in the graph g. In contrast, as shown in FIG. 1B, self-attention weights between disconnected pairs of nodes, can be obtained, and attention weights between certain direct neighboring nodes can be updated. For example, the self-attention weight $\alpha'_{D,C}$ for the pair of nodes C and D can be obtained by $\alpha'_{D,C}=f([\alpha_{B,C},\alpha_{D,B}])$, which is calculated from the attention weight $\alpha_{B,C}$ and the attention weight $\alpha_{D,B}$, and the attention weight between the nodes B and A can be updated by $\alpha'_{A,B}=f([\alpha_{D,B},\alpha_{A,D}],[\alpha_{A,B}])$, which considers the effect from the attention weight $\alpha_{D,B}$ and the attention weight $\alpha_{A,D}$ on the attention weight $\alpha_{A,B}$. The calculation of the self-attention weights between disconnected nodes in FIG. 1B is based on the attention weights between direct neighboring nodes in FIG. 1A, and is an inventive concept according to certain embodiments of the present disclosure.

Preliminaries to MAGNA

Let $\mathcal{G}=(V,\varepsilon)$ be the given knowledge graph, where V is the set of $N_n$ number of nodes, $\varepsilon \subseteq V \times V$ is the set of $N_e$ number of edges connecting M pairs of nodes in V. Each node $v \in V$ and each edge $e \in \varepsilon$ are associated with their type mapping functions: $p: V \to \mathcal{T}$ and $\psi: \varepsilon \to \mathcal{R}$. Here $\mathcal{T}$ and $\mathcal{R}$ denote the sets of node labels and edge/relation types. The $\mathcal{R}$MAGNA application supports learning on heterogeneous graphs with multiple elements in $\mathcal{R}$.

A general graph neural network (GNN) approach learns an embedding that maps nodes and/or edge types into a continuous vector space. Let $X \in \mathbb{R}^{N_n \times d_n}$ and $R \in \mathbb{R}^{N_r \times d_r}$ be the node embedding and edge/relation type embedding, where $N_n=|V|$, $N_r=|\mathcal{R}|$, $d_n$ and $d_r$ represent the embedding dimension of node and edge/relation types, each row $x_i=X[i:]$ represents the embedding of node $v_i$ ($1 \le i \le N_n$), and $r_j=R[j:]$ represents the embedding of relation $r_j$ ($1 \le j \le N_r$).

MAGNA builds on GNNs, while bringing together the benefits of Graph Attention and Diffusion techniques. The core of MAGNA is Multi-hop Attribution Diffusion, a principled way to learn attention between any pair of nodes in a scalable way, taking into account the graph structure and enabling multi-hop context-dependent attention directly.

The key challenge here is how to allow for flexible but scalable context-dependent multi-hop attention, where any node can influence embedding of any other node in a single GNN layer (even if they are far away in the underlying network). Simply learning attention score over all node pairs is infeasible, and would lead to overfitting and poor generalization.

Multi-Hop Attention Diffusion in MGANA

In certain aspect, attention diffusion is introduced by computing multi-hop attention directly at each block of the MAGNA based on attention scores in each MAGNA block. The input to the attention diffusion operator is a set of triples $(v_i, r_k, v_j)$ that are currently available in a knowledge graph, where $v_i, v_j$ are nodes and $r_k$ is the edge type. MAGNA first computes the attention scores on all available edges. The attention diffusion module of MAGNA then computes the attention values between pairs of nodes that are not directly connected by an edge, based on the edge attention scores, via a diffusion process. The attention diffusion module can then be used as a component in MAGNA architecture.

To compute the attention diffusion, in the first stage, MAGNA calculates one-hop edge attention, i.e., attention between nodes connected by edges. The MAGNA include one or multiple blocks, and each MAGNA block is also named a MAGNA layer. At each MAGNA block (or layer) l, a vector message is computed for each triple $(v_i, r_k, v_j)$. To compute the representation of $v_j$ at block or layer l+1, all messages from triples incident to $v_j$ are aggregated into a single message, which is then used to update $v_j^{l+1}$.

The disclosure first computes an attention score s of an edge $(v_i, r_k, v_j)$ by:

$$s_{i,k,j}^{(l)} = \text{LeakyReLU}(v_\alpha^{(l)} \tan h(W_h^{(l)} h_i^{(l)} \| W_t^{(l)} h_j^{(l)} \| W_r^{(l)} r_k)) \quad (1),$$

where $W_h^{(l)}$, $W_t^{(l)} \in \mathbb{R}^{d^{(l)} \times d^{(l)}}$, $W_r^{(l)} \in \mathbb{R}^{d^{(l)} \times d_r}$ and $V_\alpha^{(l)} \in \mathbb{R}^{1 \times 3d^{(l)}}$ are the trainable weights shared by the l-th layer, $d^{(l)}$ or d is dimension of the nodes, and $d_r$ is dimension of the edges. $h_i^{(l)} \in \mathbb{R}^{d^{(l)}}$ represents the embedding of node i at the l-th layer, and $h_i^{(0)}=x_i$. $r_k$ is the trainable relation embedding of the k-th relation type $r_k$ ($1 \le k \le N_r$), and a||b denotes concatenation of embedding vectors a and b. For graphs with no relation type, the disclosure treats the relation type as a degenerate categorical distribution with one category.

Applying equation (1) on each edge of the graph $\mathcal{G}$, the disclosure obtains an attention score matrix $S^{(l)}$:

$$S_{i,j}^{(l)} = \begin{cases} s_{i,k,j}^{(l)}, & \text{if } (v_i, r_k, v_j) \text{ appears in } \mathcal{G} \\ -\infty, & \text{otherwise} \end{cases} \quad (2)$$

Subsequently, the disclosure obtains attention matrix $A^{(l)}$ by performing row-wised softmax over the score matrix $S^{(l)}$: $A^{(l)}=\text{softmax}(S^{(l)})$. The attention matrix $A^{(l)}$ is the one-hope attention, and $A_{ij}^{(l)}$ in the attention matrix $A^{(l)}$ denotes the attention value at the l-th layer when aggregating message from node j to node i.

In the second stage, MAGNA calculates attention diffusion for multi-hop neighbors based on the one-hope edge attention matrix $A^{(l)}$ at the l-th block or layer. In this stage, the disclosure enables attention between nodes that are not directly connected in the knowledge graph network. The enablement is achieved via the following attention diffusion procedure, where the disclosure first computes the attentions scores of multi-hop neighbors via graph diffusion based on the powers of the 1-hopt attention matrix A:

$$\mathcal{A} = \sum_{i=0}^{\infty} \theta_i A^i \quad (3)$$

where $\sum_{i=0}^{\infty} \theta_i = 1$ and $\theta_i > 0$.

Here $\mathcal{A}$ is multi-hop attention, $A^i$ is the powers of one-hop attention matrix A (one hop attention matrix $A^{(l)}$ at the l-th MAGNA block), i is an integer equals to or greater than 0 (kindly differentiate the power i here from the node i disclosed in other parts of the disclosure), and $\theta_i$ is the attention decay factor and $\theta_i > \theta_{i+1}$. The powers of attention matrix, $A^i$, give us the number of relation paths between two nodes of length up to i, increasing the receptive field of the attention. For example, a two-hop attention can be calculated as: $\mathcal{A} = \theta_0 I + \theta_1 A + \theta_2 A^2$, and a three-hop attention can be calculated as: $\mathcal{A} = \theta_0 I + \theta_1 A + \theta_2 A^2 + \theta_3 A^3$, where I is the identify matrix. As shown by equation (3), the mechanism allows the attention between two nodes to not only depend on their previous layer representations, but also taking into account of the paths between the nodes, effectively creating attention shortcuts between nodes that are not directly connected. Attention through each path is also weighted differently, depending on θ and the path length i. In certain embodiments, the disclosure utilizes the geometric distribution $\theta_i = \alpha(1-\alpha)^i$, where $\alpha \in (0, 1]$. The choice is based on the inductive bias that nodes further away should be weighted less in message aggregation, and nodes with different relation path lengths to the target node are sequentially weighted in an independent manner. In addition, notice that if we define $\theta_0 = \alpha \in (0, 1]$, and $A^i = I$, then equation (3) gives the Personalized Page Rank (PPR) procedure on the graph with the attention matrix A and teleport probability α. Hence the diffused attention weights, $\mathcal{A}_{ij}$, can be seen as the influence of node j to node i.

We can also view $\mathcal{A}_{ij}$ as the attention value of node j to i since $\Sigma_{j=1}^{N_n} \mathcal{A}_{ij} = 1$ (obtained by the attention definition $A^{(l)} = \text{softmax}(S^{(l)})$ and equation (3)). The disclosure then define the graph attention diffusion based feature aggregation as:

$$\text{AttDiffusion}(\mathcal{G}, H^{(l)}, \Theta) = \mathcal{A} H^{(l)} \quad (4)$$

Here $\mathcal{G}$ represents the knowledge graph, $H^{(l)}$ is the embedding of the nodes at the l-th MAGNA block, and $\Theta$ is the set of parameters for computing attention. Thanks to the diffusion process defined in equation (3), MAGNA uses the same number of parameters as if we were only computing attention between nodes connected via edges. In other words, the learnable parameter $\Theta$ is the same as or is equivalent to the learnable parameters $W_h^{(l)}$, $W_t^{(l)}$, $W_r^{(l)}$, and $v_\alpha^{(l)}$ in equation (1). This ensures runtime efficiency as well as good model generalization.

The $\mathcal{A} H^{(l)}$ is the attention diffusion the disclosure aims to get. However, for large graphs, computing the exact attention diffusion matrix $\mathcal{A}$ using equation (3) may be prohibitively expensive, due to computing the powers i of the attention matrix A. To solve this bottleneck, in certain embodiments, the present disclosure provides an approximation computation for attention diffusion $\mathcal{A} H^{(l)}$. Particularly, the disclosure lets $H^{(l)}$ be the input entity embedding of the l-th block or layer ($H^{(0)} = X$) and $\theta_i = \alpha(1-\alpha)^i$. Since MAGNA only requires aggregation via $\mathcal{A} H^{(l)}$, the disclosure approximate $\mathcal{A} H^{(l)}$ by defining a sequence $Z^{(K)}$ which converges to the true value of $\mathcal{A} H^{(l)}$ as $K \to \infty$:

$$Z^{(0)} = H^{(l)}, Z^{(k+1)} = (1-\alpha)AZ^{(k)} + \alpha Z^{(0)}, \text{ where } 0 \leq k \leq K \quad (5)$$

Proposition 1.

$$\lim_{K \to \infty} Z^{(k)} = \mathcal{A} H^{(l)}.$$

Using the above approximation by equation (5) to replace the calculations by equations (3) and (4), the complexity of attention computation with diffusion is still O(|E|), with a constant factor corresponding to the number of hops K. In certain embodiments, the disclosure defines the values of K in a range of $3 \leq K \leq 10$, which results in good model performance. Many real-world graph exhibit small-world property, in which case even a smaller value of K is sufficient. For graphs with larger diameter, the disclosure chooses larger K, and lower the value of α.

Direct Multi-Hop Attentions Based GNN Architecture

Figure 2:
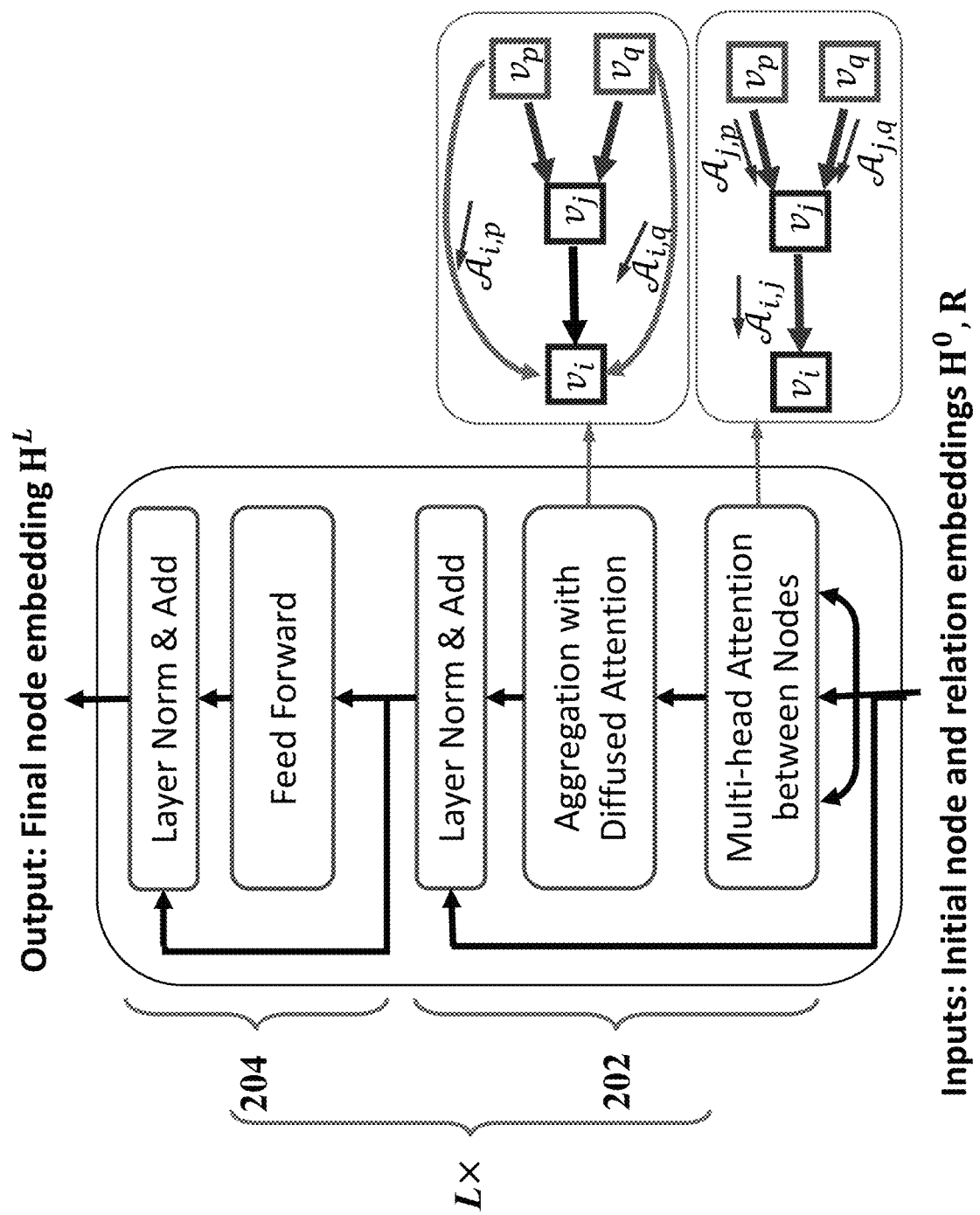
FIG. 2 schematically depicts a multi-hop attention graph neural networks (MAGNA) architecture according to certain embodiments of the present disclosure.

Using on the above described computation of multi-hop attention diffusion by equations (1), (2), and (5), or alternatively by equations (1) to (4), the present disclosure provides a direct multi-hop attention based GNN architecture, i.e., the MAGNA. FIG. 2 schematically depicts a MAGNA architecture according to certain embodiments of the present disclosure. As show in FIG. 2, the MAGNA architecture include L stacked blocks. Each stacked block has a multi-head attention diffusion layer 202 and a deep aggregation layer 204.

As shown in FIG. 2, the multi-head graph attention diffusion layer 202 includes multi-head attention between nodes, aggregation with diffused attention, and layer normalization and addition. Multi-head attention is used to allow the model to jointly attend to information from different representation sub-spaces at different view-points. In equation (6), the attention diffusion for each head i is computed separately with equation (4) and aggregated:

$$\hat{H}^{(l)} = \text{MultiHead}(\mathcal{G}, \tilde{H}^{(l)} = (\|_{i=1}^M \text{head}_i) W_o, \quad (6)$$

where $\text{head}_i = \text{AttDiffusion}(\mathcal{G}, \tilde{H}^{(l)}, \Theta_i)$, $\tilde{H}^{(l)} = \text{LayerNorm}(H^{(l)})$.

Here $\|$ denotes concatenation, $\Theta$, are the parameters in equation (1) for the i-th head ($1 \leq i \leq M$), and $W_o$ represents a parameter matrix. Since the disclosure calculates the attention diffusion in a recursive way in equation (5), the disclosure adds layer normalization which is helpful to stabilize the recurrent computation procedure. As the last step of the multi-head graph attention diffusion layer 202, and addition is performed by: $\hat{H}^{(l+1)} = \hat{H}^{(l)} + H^l$.

As shown in FIG. 2, the deep aggregation layer 204 includes a fully connected feed forward sub-layer. In certain embodiments, the fully connected feed-forward sub-layer consists a two-layer feed-forward network, such as a two-layer MLP. Further, layer normalization and residual connection are added in both the sub-layers 202 and 204, allowing for a more expressive aggregation step for each block.

$$H^{(l+1)} = W_2^{(l)} \text{ReLU}(W_1^{(l)} \text{LayerNorm}(\hat{H}^{(l+1)})) + \hat{H}^{(l+1)} \quad (7)$$

In reviewing the above description, MAGNA is different from GAT, and it generalizes GAT. MAGNA extends GAT via the diffusion process. The feature aggregation in GAT is $H^{(l+1)} = \sigma(AH^{(l)}W^{(l)})$, where σ represents the activation function. We can divide GAT layer into two components as follows:

$$H^{(l+1)} = \underset{(2)}{\sigma} \underset{(1)}{(AH^{(2)} W^{(l)})} \quad (8)$$

In component (1), MAGNA removes the restriction of attending to direct neighbors, without requiring additional parameters as is induced from $\mathcal{A}$. For component (2), MAGNA uses layer normalization and deep aggregation which achieves significant gains according to ablation studies in Table 1 described later in the Experiments section of the disclosure. Compared to the "shallow" activation function elu in GAT, we can view deep aggregation (i.e., two-layer MLP) as a learnable deep activation function as two layer MLP can approximate many different functions.

Analysis of Graph Attention Diffusion

In this section, we investigate the benefits of MAGNA from the viewpoint of discrete signal processing on graphs (Sandryhaila & Moura, Discrete signal processing on graphs: graph Fourier transform, ICASSP, 2013). Our first result demonstrates that MAGNA can better capture large-scale structural information. Our second result explores the relation between MAGNA and Personalized PageRank (PPR).

SPECTRAL PROPERTIES OF GRAPH ATTENTION DIFFUSION. We view the attention matrix A of GAT, and $\mathcal{A}$ of MAGNA as weighted adjacency matrices, and apply graph Fourier transform and spectral analysis to show the effect of MAGNA as a graph low-pass filter, being able to more effectively capture large-scale structure in graphs. By equation (3), the sum of each row of either $\mathcal{A}$ or A is 1. Hence the normalized graph Laplacians are $\hat{L}_{sym}=I-\mathcal{A}$ and $L_{sym}=I-A$ for $\mathcal{A}$ and A, respectively. We can get the following proposition:

Proposition 2. Let $\hat{\lambda}_i^g$ and $\lambda_i^g$ be the i-th eigenvalues of $\hat{L}_{sym}$ and $L_{sym}$:

$$\frac{\hat{\lambda}_i^g}{\lambda_i^g} = \frac{1-\frac{\alpha}{1-(1-\alpha)(1-\lambda_i^g)}}{\lambda_i^g} = \frac{1}{\frac{\alpha}{1-\alpha}+\lambda_i^g}. \quad (9)$$

We additionally have $\lambda_i^g \in [0, 2]$. Equation (9) shows that when $\lambda_i^g$ is small such that $$\frac{\alpha}{1-\alpha}+\lambda_i^g < 1,$$

then $\hat{\lambda}_i^g > \lambda_i^g$, whereas for large $\lambda_i^g$, $\hat{\lambda}_i^g < \lambda_i^g$. This relation indicates that the use of $\mathcal{A}$ increases smaller eigenvalues and decreases larger eigenvalues. The low-pass effect increases with smaller $\alpha$.

The eigenvalues of the low-frequency signals describe the large-scale structure in the graph and have been shown to be crucial in graph tasks. As $\lambda_i^g \in [0, 2]$, and $$\frac{\alpha}{1-\alpha} > 0,$$

the reciprocal format in equation (9) 9 will amplify the ratio of lower eigenvalues to the sum of all eigenvalues. In contrast, high eigenvalues corresponding to noise are suppressed.

PERSONALIZED PAGERANK MEETS GRAPH ATTENTION DIFFUSION. We can also view the attention matrix A as a random walk matrix on graph $\mathcal{G}$ since $\Sigma_{j=1}^{N_n} A_{i,j}=1$ and $A_{i,j}>0$. If we perform Personalized PageRank (PPR) with parameter $\alpha \in (0, 1]$ on $\mathcal{G}$ with transition matrix A, the fully Personalized PageRank is defined as:

$$A_{ppr}=\alpha(I-(1-\alpha)A)^{-1} \quad (10)$$

Using the power series expansion for the matrix inverse, we obtain:

$$A_{ppr}=\alpha\Sigma_{i=0}^{\infty}(1-\alpha)^i A^i = \Sigma_{i=0}^{\infty}\alpha(1-\alpha)^i A^i \quad (11)$$

Comparing to the diffusion equation (3) with $\theta_i=\alpha(1-\alpha)^i$, we have the following proposition:

Proposition 3. Graph attention diffusion defines a personalized page rank with parameter $\alpha \in (0, 1]$ on $\mathcal{G}$ with transition matrix A, i.e., $\mathcal{A}=A_{ppr}$.

The parameter in MAGNA is equivalent to the teleport probability of PPR. PPR provides a good relevance score between nodes in a weighted graph (the weights from the attention matrix A). In summary, MAGNA places a PPR prior over node pairwise attention scores: the diffused attention between node i and node j depends on the attention scores on the edges of all paths between i and j.

Implementation of the Present Disclosure in a Computing Device The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 3A:
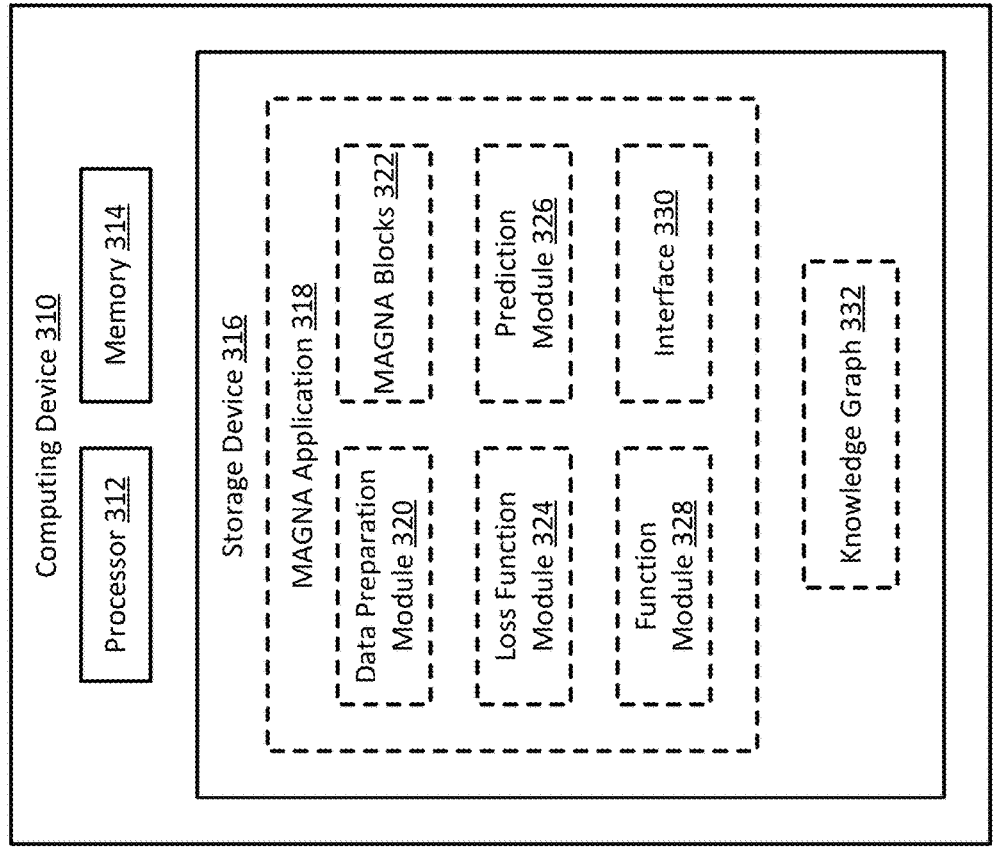
FIG. 3A schematically depicts a multi-hop attention graph system according to certain embodiments of the present disclosure.

FIG. 3A schematically depicts a multi-hop attention graph system according to certain embodiments of the present disclosure. As shown in FIG. 3A, the system 300 includes a computing device 310. In certain embodiments, the computing device 310 may be a server computer, a cluster, a cloud computer, a general-purpose computer, a headless computer, or a specialized computer, which provides note classification or knowledge graph completion services. The computing device 310 may include, without being limited to, a processor 312, a memory 314, and a storage device 316. In certain embodiments, the computing device 310 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 312 may be a central processing unit (CPU) which is configured to control operation of the computing device 310. The processor 312 can execute an operating system (OS) or other applications of the computing device 310. In certain embodiments, the computing device 310 may have more than one CPU as the processor, such as two CPUs, four CPUs, eight CPUs, or any suitable number of CPUs. The memory 314 can be a volatile memory, such as the random-access memory (RAM), for storing the data and information during the operation of the computing device 310. In certain embodiments, the memory 314 may be a volatile memory array. In certain embodiments, the computing device 310 may run on more than one memory 314. The storage device 316 is a non-volatile data storage media for storing the OS (not shown) and other applications of the computing device 310. Examples of the storage device 316 may include non-volatile memory such as flash memory, memory cards, USB drives, hard drives, floppy disks, optical drives, solid-state drive, or any other types of data storage devices. In certain embodiments, the computing device 310 may have multiple storage devices 316, which may be identical storage devices or different types of storage devices, and the applications of the computing device 310 may be stored in one or more of the storage devices 316 of the computing device 310.

In this embodiments, the processor 312, the memory 314, and the storage device 316 are component of the computing device 310, such as a server computing device. In other embodiments, the computing device 310 may be a distributed computing device and the processor 312, the memory 314, and the storage device 316 are shared resources from multiple computing devices in a pre-defined area.

The storage device 316 includes, among other things, a multi-hop attention graph neural network (MAGNA) application 318 and a knowledge graph 332. The MAGNA application 318 is configured to train its model structure using labels of the knowledge graph 332, and make predictions to improve or complete the knowledge graph 332. The knowledge graph 332 is optional for the computing device 310, as long as the knowledge graph stored in other devices is accessible to the MAGNA application 318.

As shown in FIG. 3A, the MAGNA application 318 includes a data preparation module 320, one or multiple MAGNA blocks 322, a loss function module 324, a prediction module 326, a function module 328, and an interface 330. In certain embodiments, the MAGNA application 318 may include other applications or modules necessary for the operation of the MAGNA application 318. It should be noted that the modules 320-330 are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained using training data, and after well trained, can be used to make a prediction.

The data preparation module 320 is configured to prepare training samples or prediction samples, and send the prepared training samples or prediction samples to the MAGNA blocks. The knowledge graph 332 may have over one thousand nodes up to several hundreds of thousand nodes, but the type of edges generally is limited, such as one type of edge (Yes and No) or several types of edges. Features of the nodes are stored in the knowledge graph 332, which could be age, gender, location, education, etc. of a customer when the nodes include customers. Edges or relations between nodes are stored in the knowledge graph 332, such as a customer node and a product node may have the relation of browsing or purchasing. In certain embodiments, the knowledge graph 332 may not be a complete knowledge graph, and it may lack features of nodes or lack edges between certain related nodes. Under this situation, both the training samples and the prediction samples may be the knowledge graph 332. Known labels of nodes and edges between the nodes in the knowledge graph 332 are used for the training of the MAGNA application 218. After training, the well-trained MAGNA application 318 can then be used to obtain features of more nodes in the knowledge graph 332, or be used to complete the knowledge graph 230. In certain embodiments, the data preparation module 320 may prepare the knowledge graph 332 by embedding the nodes and edges into vectors. Particularly, let $\mathcal{G} = (V,\varepsilon)$ be the given knowledge graph 332, where V is the set of $N_n$ nodes, $\varepsilon \subseteq V \times V$ is the set of $N_e$ edges connecting M pairs of nodes in V. Each node $v \in V$ and each edge $e \in \varepsilon$ are associated with their type mapping functions: $\phi: V \to \mathcal{T}$ and $\psi: \varepsilon \to \mathcal{R}$. Here $\mathcal{T}$ and $\mathcal{R}$ denote the sets of node types (labels) and edge/relation types. The MAGNA application 318 supports learning on heterogeneous graphs with multiple elements in $\mathcal{R}$.

Figure 3B:
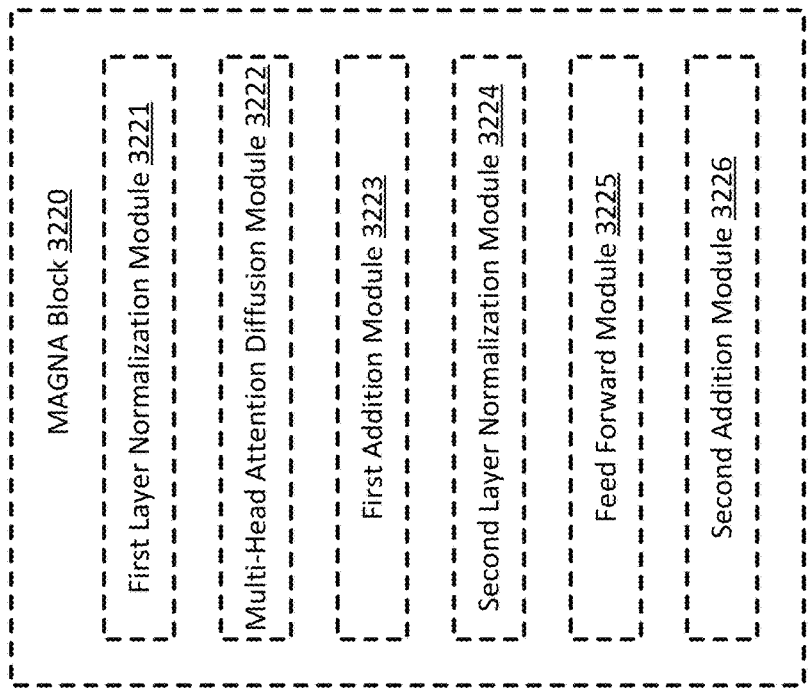
FIG. 3B schematically depicts a MAGNA block according to certain embodiments of the present disclosure.

The MAGNA blocks 322 is configured to, upon receiving the training knowledge graph or the knowledge graph for prediction from the data preparation module 320, train the MAGNA blocks 322 and the classifier or KG completion module 326, or use the well-trained MAGNA blocks 322 and the classifier or KG completion module 326 to make predictions. The MAGNA blocks 322 may include one or multiple MAGNA blocks 3220 that each have a same block structure. FIG. 3B schematically depicts one MAGNA block 3220 according to certain embodiments of the present disclosure. As shown in FIG. 3B, the MAGNA block 3220 includes a first layer normalization module 3221, a multi-head attention diffusion module 3222, a first addition module 3223, a second layer normalization module 3224, a feed forward module 3225, and a second addition module 3226.

At the start of a training of the MAGNA application 318, the embedding node $H^{(0)}$ is available to both the first layer normalization module 3221 and the first addition module 3223 of the first MAGNA block. After operation of the l-th MAGNA block, the outputted node embedding for that block, i.e., $H^{(l)}$, is available to both the first layer normalization module 3221 and the first addition module 3223 of the next MAGNA block. When the current MAGNA block is the last MAGNA block, the outputted node embedding is provided to the classifier or KG completion module 326.

The first layer normalization module 3221 is configured to, upon receiving the inputted node embeddings $H^{(l)}$ at the l-th block, perform layer normalization on the inputted node and edge embeddings $H^{(l)}$ to obtain first normalized embedding I, and send the first normalized embedding to the multi-head attention diffusion module 3222. The first layer normalization is defined as: $\tilde{H}^{(l)} = \text{LayerNorm}(H^{(l)})$.

The multi-head attention diffusion module 3222 is configured to, upon receiving the first normalized embedding $\tilde{H}^{(l)}$, compute attention diffusion heads for each head, aggregate the attention diffusions for all the heads to obtain node embedding with aggregated attention diffusion $\hat{H}^{(l)}$, and send the node embedding with aggregated attention diffusion $\hat{H}^{(l)}$ to the first addition module 3223. The attention diffusion for head i is calculated by $\text{head}_i = \text{AttDiffusion}(\mathcal{G}, \tilde{H}^{(l)}, \Theta_i)$, which can be calculated from the equations (1), (2), (3), and (4) using the first normalized embedding $\tilde{H}^{(l)}$ and model parameters of the multi-head attention diffusion module 3222. In certain embodiments, the attention diffusion for head i is approximately calculated using equation (5) instead of using equations (3) and (4). When the attention diffusion for all the heads are available, the attention diffusions are concatenated by equation (6): $\hat{H}^{(l)} = \text{MultiHead}(\mathcal{G}, \tilde{H}^{(l)}) = (\|_{i=1}^{M} \text{head}_i) W_o$.

The first addition module 3223 is configured to, upon receiving the aggregated attention diffusion $\tilde{H}^{(l)}$, add the aggregated attention diffusion to the inputted embedding to obtain embedding with first addition $\hat{H}^{(l+1)}$, and send the embedding with the first addition $\hat{H}^{(l+1)}$ to the second layer normalization module 3224 and the second addition module 3226. The inputted embedding could be the node embeddings from a previous MAGNA block, or from the initial embedding $H^0$ if the current MAGNA block 3220 is the first of the MAGNA blocks. The addition step is defined as: $\hat{H}^{(l+1)} = \tilde{H}^{(l)} + H^l$.

The second layer normalization module 3224 is configured to, upon receiving the embedding with the first addition $\hat{H}^{(l+1)}$, normalized the embedding to obtain second normalized embedding, and send the second normalized embedding to the feed forward module 3225. The layer normalization is performed by LayerNorm($H^{(l+1)}$).

The feed forward module 3225 is configured to, upon receiving the embedding with the first addition $\hat{H}^{(l+1)}$ from the first layer addition module 3223 and the second normalized embedding LayerNorm($H^{(l+1)}$), perform feed forward to obtain feed forward embedding $W_2^{(l)}$ReLU ($W_1^{(l)}$LayerNorm($H^{(l+1)}$)), and send the feed forward embedding to the second addition module 3226.

The second addition module 3226 is configured to, upon receiving the embedding with the first addition $\hat{H}^{(l+1)}$ from the first addition module 3223 and the feed forward embedding $W_2^{(l)}$ReLU ($W_1^{(l)}$LayerNorm($H^{(l+1)}$)) from the feed forward module 3225, perform an addition of the two to obtain the updated node embedding $H^{(l+1)}$ by: $H^{(l+1)} = W_2^{(l)}$ ReLU ($W_1^{(l)}$LayerNorm($H^{(l+1)}$))$+\hat{H}^{(l+1)}$ (7), such that the updated node embedding $H^{(l+1)}$ is available to the (l+1)-th MAGNA block, or available to the loss function module 324 when the current block is the last MAGNA block.

Referring back to FIG. 3B, the loss function module 324 is configured to, upon receiving the updated node embedding $H^{(l+1)}$, use the updated node embedding to classify the nodes that already have labels, or to predict edge relations that already have labels, compare the classified node labels or the predicted edge relations to the previous labels, calculate a loss function based on the comparison, adjust model parameters of the MAGNA blocks 322, and perform another round of training. The training may be ended when a predefined rounds of training has been performed, or the model parameters are converged. When the model is well trained, the loss function module 324 is further configured to notify the prediction module 326.

The prediction module 326 is configured to, upon receiving the notice from the loss function module 324 that the model is well trained, using the well-trained MAGNA blocks 322 to classify the nodes that do not have a classified type, or predict relations between the nodes that are not linked by edges, add the new node classifications, and/or new edges, and/or new edge relations to the knowledge graph 332 such that the knowledge graph 332 is updated with more information. The updated knowledge graph 332 is available to the function module 328. In certain embodiments, the prediction module 326 is a decoder of a transformer in the field. In certain embodiments, the decoder is a classifier.

The function module 328 is configured to, when the knowledge graph 332 is updated, using the updated knowledge graph to perform certain functions. For example, when the knowledge graph 332 is a customer and product knowledge graph, the knowledge graph 332 may be used to recommend a product to one or more customers when there is a prediction that the customers will be interested in the product, which may be indicated by an edge or a relation linking the product and the customers. In certain embodiments, the knowledge graph 332 may be customers, and each customer may be classified as a high credit score customer or a low credit score customer. By updating the classification of the customer belong to high credit or low credit via the prediction module 326, credit information of more customers are available, and the credit information of the customer may be used by loan companies.

In certain embodiments, the function module 328 is configured to perform the above function automatically or in a predefined time interval, or when trigged by an update of the knowledge graph 322. For example, after the update of the knowledge graph 332, the function module 328 would look for more linked relations between products and customers, and the function module 328 would subsequently push the products to the corresponding customers when the updated relations between the customers and the products are interested in.

The interface 330 is configured to provide an interface for an administrator of the MAGNA application 318 to train the MAGNA blocks 322 and optionally the loss function module 324, and adjust model parameters, or is configured to provide an interface for the administrator to use the MAGNA application 318 to obtain and use the updated knowledge graph 332 for certain functions.

Kindly note that i in different context of the present disclosure may have different meanings. For example, the i in $v_i$ means the i-th node, the i in $\theta_i$ and $A^i$ is a positive integer indicating the path length of edges between nodes, the i in head$_i$ represents the i-th head for calculating attention diffusion.

Figure 4:
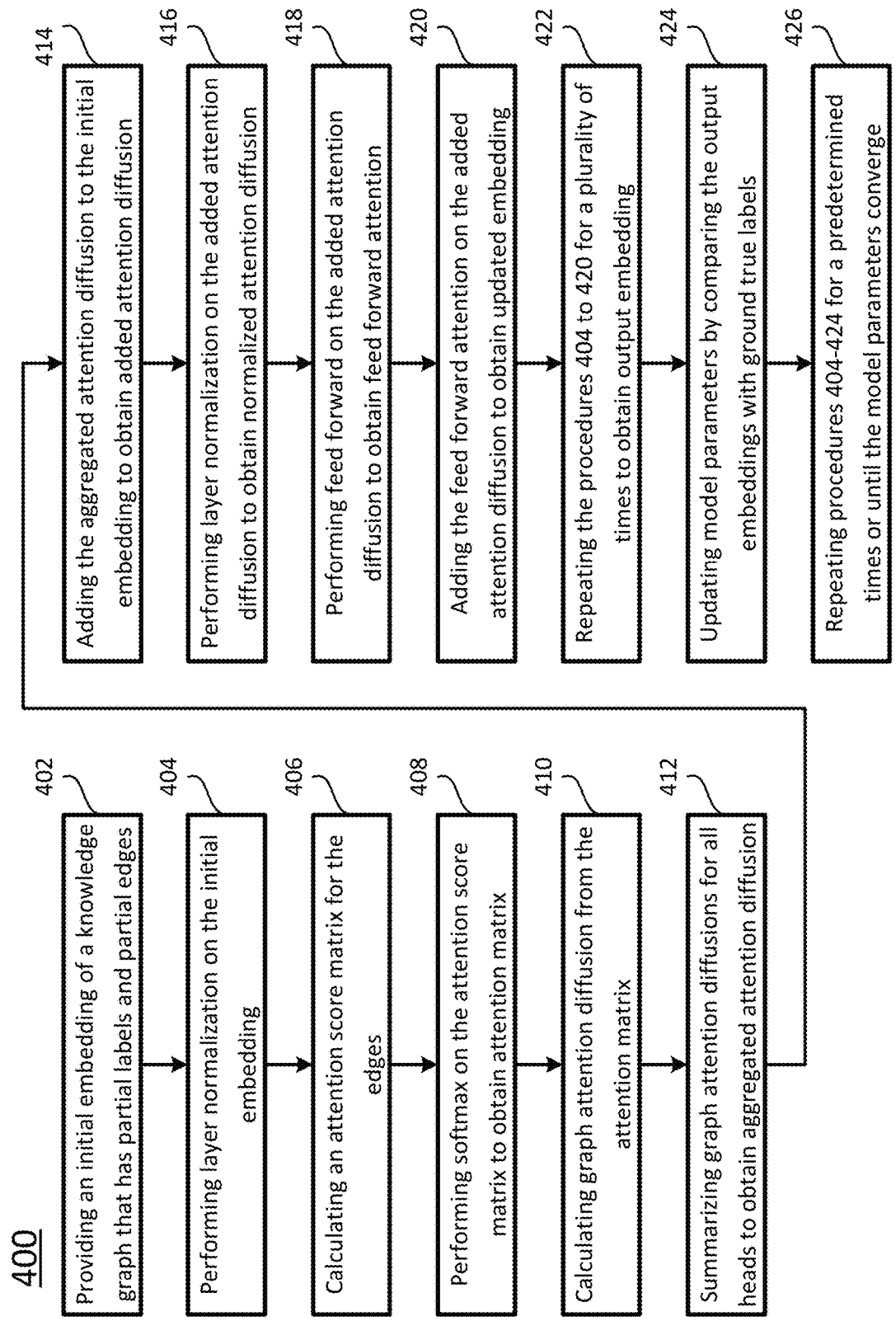
FIG. 4 schematically depicts a training process for a MAGNA application according to certain embodiments of the present disclosure.

FIG. 4 schematically depicts a training process for the MAGNA application according to certain embodiments of the present disclosure. In certain embodiments, the training process is implemented by the computing device 310 shown in FIG. 3A. It should be particularly noted that, unless otherwise stated in the present disclosure, the steps of the training process or method may be arranged in a different sequential order, and are thus not limited to the sequential order as shown in FIG. 4.

As shown in FIG. 4, at procedure 402, the data preparation module 320 retrieves the knowledge graph 332, processes the knowledge graph 332 to obtain initial embedding $H^0$ of the knowledge graph 332, and provides the initial embedding $H^0$ to the first MAGNA block 3320 of the MAGNA blocks 322. The knowledge graph 332 has labeled nodes and edges, but the labels of the nodes may not be complete, and the knowledge graph 332 may lack a lot of edges. The initial embedding $H^0$ is the embedding of the entities or the nodes of the knowledge graph 332.

At procedure 404, the first layer normalization module 3221 of the first MAGNA block 3220 performs layer normalization on the initialized embedding to obtain normalized embedding $\tilde{H}^{(0)}$, i.e., $\tilde{H}^{(0)} = $ LayerNorm($H^{(0)}$), and sends the normalized embedding to the multi-head attention diffusion module 3222.

At procedure 406, upon receiving the normalized embedding $\tilde{H}^{(0)}$, the multi-head attention diffusion module 3222 calculates an attention score matrix, where each row of the attention score matrix is an attention score of an edge. The attention score of one of the edges ($v_i$, $r_k$, $v_j$) is calculated using: $s_{i,k,j}^{(0)} = $ LeakyReLU($v_\alpha^{(0)}$ tan h($W_h^{(0)} h_i^{(0)} \| W_t^{(0)} h_j^{(0)} \| W_r^{(0)} r_k$)) (1), and the attention score matrix $S_{i,j}^{(0)}$ is summarized by:

$$S_{i,j}^{(l)} = \begin{cases} s_{i,k,j}^{(l)}, & \text{if } (v_i, r_k, v_j) \text{ appears in } \mathcal{G} \\ -\infty, & \text{otherwise} \end{cases} \quad (2)$$

Accordingly, the attention score matrix includes attention score for each of the edges that are currently exist in the knowledge graph 332.

At procedure 408, the multi-head attention diffusion module 3222 performs softmax on the attention score matrix $S_{i,j}^{(0)}$ to obtain attention matrix $A^{(0)}$, where $A^{(0)} =$ softmax($S^{(0)}$).

At procedure 410, the multi-head attention diffusion module 3222 calculates graph attention diffusion $\mathcal{A} H^{(0)}$ using the attention matrix $A^{(0)}$. In certain embodiments, to increase the calculation speed, the graph attention diffusion $\mathcal{A} H^{(0)}$ is approximately calculated. Specifically, by defining $Z^{(0)} = \tilde{H}^{(0)}$ and $Z^{(k+1)} = (1-\alpha)AZ^{(k)} + \alpha Z^{(0)}$, then $Z^{(K)} = \mathcal{A} \tilde{H}^{(0)}$. Here a is a predefined constant in a range of 0-0.5. In certain embodiments, $\alpha$ is in a range of 0.05 to 0.25. In certain embodiments, a is in a range of 0.1 to 0.2. In certain embodiments, a is 0.1 or 0.15. $0 \leq k \leq K$, and K is a positive integer in a range of 3-10. In certain embodiments, K is in a range of 4-8. In certain embodiments, K is 6. The values of $\alpha$ and K may vary according to the size and features of the knowledge graph 332. For example, assume that $\alpha$ is 0.1 and K is 6, then $Z^{(1)} = 0.9AZ^{(0)} + 0.1Z^{(0)}$, $Z^{(2)} = 0.9AZ^{(1)} + 0.1Z^{(0)}$, $Z^{(3)} = 0.9AZ^{(2)} + 0.1Z^{(0)}$, $Z^{(4)} = 0.9AZ^{(3)} + 0.1Z^{(0)}$, $Z^{(5)} = 0.9AZ^{(4)} + 0.1Z^{(0)}$, $Z^{(6)} = 0.9AZ^{(5)} + 0.1Z^{(0)}$, and $Z^{(6)}$ is the graph attention diffusion, which is the approximation of $\mathcal{A} \tilde{H}^{(0)}$. In certain embodiments, the calculation of the graph attention diffusion $\mathcal{A} H^{(0)}$ can also be performed using the equations (3) and (4). However, because the $Z^{(1)}$, $Z^{(2)}$, $Z^{(3)}$, $Z^{(4)}$, $Z^{(5)}$, and $Z^{(6)}$ are calculated recursively, the calculation is much faster than the calculation using the equations (3) and (4).

At procedure 412, the procedures 404-410 are performed for each head to obtain the graph attention diffusions $\mathcal{A} \tilde{H}^{(0)}$ ($Z^{(K)}$) for the heads, and the multi-head attention diffusion module 3222 summarizes the graph attention diffusions $\mathcal{A} \tilde{H}^{(0)}$ for all the heads to obtain the aggregated attention diffusion $\hat{H}^{(0)}$. That is, $\hat{H}^{(0)} = \text{MultiHead}(\mathcal{G}, \tilde{H}^{(0)}) = (\|_{m=1}^{M} \text{head}_m) W_o$ (6). After obtaining the aggregated attention diffusion $\hat{H}^{(0)}$, the multi-head attention diffusion module 3222 further sends the multi-head attention diffusion to the first addition module 3223.

At procedure 414, upon receiving the multi-head attention diffusion from the multi-head attention diffusion module 3222, the first addition module 3223 adds the aggregated attention diffusion $\hat{H}^{(0)}$ to the initial embedding $H^0$ to obtain added attention diffusion $\hat{H}^{(1)}$ by: $\hat{H}^{(1)} = \hat{H}^{(0)} + H^0$, and sends the added attention diffusion to the second layer normalization module 3224.

At procedure 416, upon receiving the added attention diffusion, the second layer normalization module 3224 performs layer normalization on the added attention diffusion to obtain normalized attention diffusion: LayerNorm($\hat{H}^{(1)}$), and sends the normalized attention diffusion to the feed forward module 3225.

At procedure 418, upon receiving the normalized attention diffusion from the second layer normalization module 3224, the feed forward module 3225 performs feed forward on the normalized attention diffusion to obtain the feed forward attention, and sends the feed forward attention to the second addition module 3226. The feed forward attention is $W_2^{(0)} \text{ReLU}(W_1^{(0)} \text{LayerNorm}(\hat{H}^{(1)}))$.

At procedure 420, upon receiving the feed forward attention from the feed forward module 3225, the second addition module 3226 adds the added attention diffusion to the feed forward attention, to obtain the updated embedding $H^{(1)}$, that is: $H^{(1)} = W_2^{(0)} \text{ReLU}(W_1^{(0)} \text{LayerNorm}(\hat{H}^{(1)})) + \hat{H}^{(1)}$ (7). After obtaining the updated embedding $H^{(1)}$, the second addition module 3226 sends the updated embedding to the second of the MAGNA blocks 322. In certain embodiments, the feed forward attention has a two-layer feed forward network, such as a two-layer MLP.

At procedure 422, the second of the MAGNA blocks repeats the procedures 404-420, but in the procedure 404, the input is not the initial embedding $H^{(0)}$, but the updated embedding $H^{(1)}$. In certain embodiments, the MAGNA blocks 322 includes 2-10 blocks. In certain embodiments, the MAGNA blocks 322 includes 3-6 blocks. The number of blocks may depend on size and features of the knowledge graph 332. The procedures 404-420 are performed for each of the blocks, so as to update the embeddings. When the number of blocks is L, the blocks would be block 0 (or layer 0), block 1 (or layer 1), ..., block (L−1) (or layer (L−1)), and the final output of the embedding would be $H^{(L)}$. After obtaining the output of the embedding $H^{(L)}$, the MAGNA blocks 322 further sends the output embedding to the loss function module 324.

At procedure 424, upon receiving the output embedding from the MAGNA blocks 322, the loss function module 324 calculates the loss function by comparing the output embedding with the ground truth labels of the knowledge graph 332, and uses the loss function to adjust parameters of the MAGNA blocks 322. In certain embodiments, the loss function is a cross entropy loss.

At procedure 426, the MAGNA application 318 performs the procedures 404-424 iteratively using updated embedding from the previous iteration, until the training is repeated for a predetermined times, or until the model parameters converge.

Figures 5A, 5B:
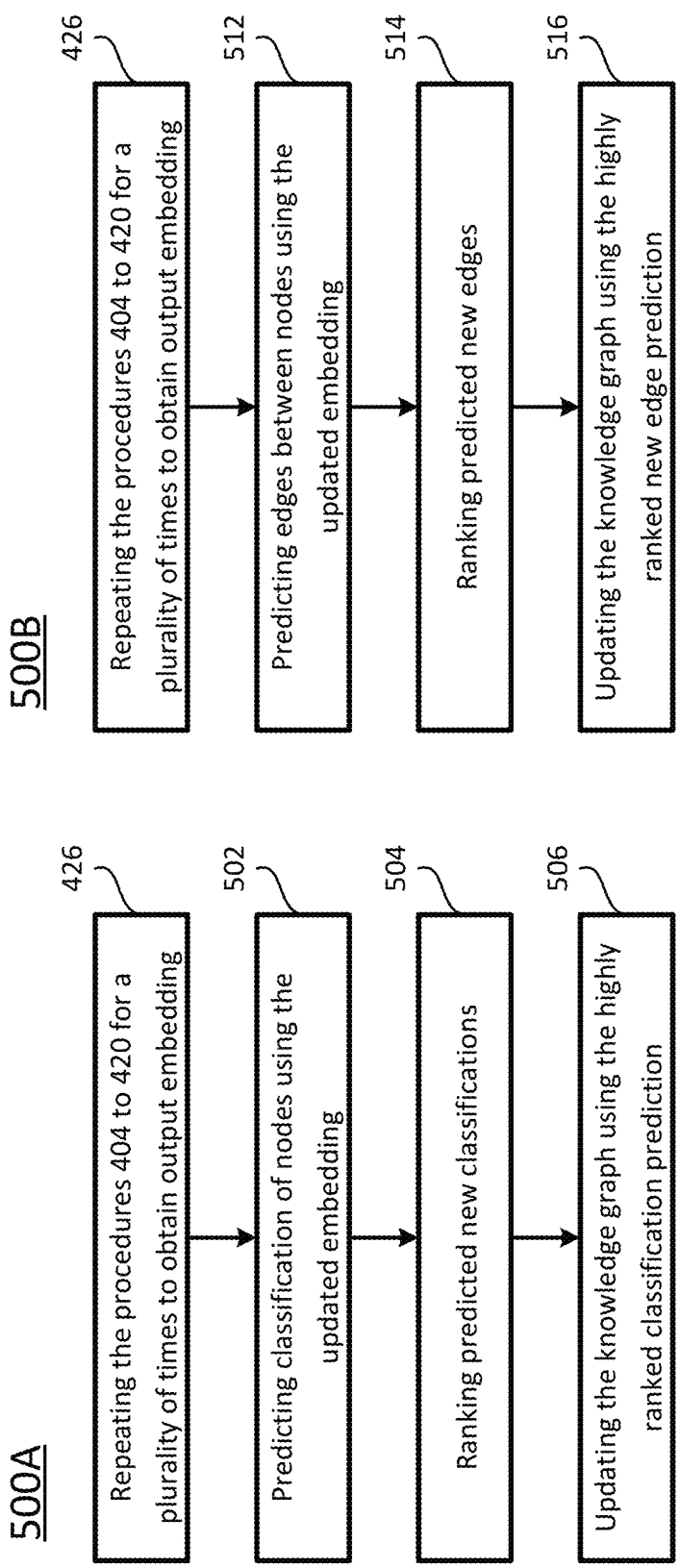
FIG. 5A schematically depicts a method for node classification according to certain embodiments of the present disclosure, after the MAGNA application is well-trained.
FIG. 5B schematically depicts a method for finding new edges according to certain embodiments of the present disclosure, after the MAGNA application is well-trained.

FIG. 5A schematically depicts method 500A for node classification according to certain embodiments of the present disclosure, after the MAGNA application 318 is well-trained. In certain embodiments, the method is implemented by the computing device 310, specifically the prediction module 326 shown in FIG. 3A. It should be particularly noted that, unless otherwise stated in the present disclosure, the steps of the training process or method may be arranged in a different sequential order, and are thus not limited to the sequential order as shown in FIG. 5A. Kindly note that the training data of the MAGNA application 318 may be the same knowledge graph 332.

As shown in FIG. 5A, at procedure 426, the procedures 404-420 are performed iteratively to keep updating embeddings of the knowledge graph until a predetermined number of iterations is completed or the parameters of the models converge. Then at procedure 502, after obtaining the updated embedding, the prediction module 326 uses the updated embedding to predict a feature of the nodes in the knowledge graph 332. For example, when the nodes are customers, the feature may be high credit score and low credit score. In certain embodiments, the prediction module 326 only predicts for the nodes that do not have the value of the feature. Alternatively, the prediction module 326 may predict the feature for all the nodes, and then filter out the nodes that already has the labels or values of the feature.

The probabilities of the predicted features of the nodes may vary, and at procedure 504, the prediction module 326 ranks the nodes based on probabilities or confidence of their predicted features from high to low.

At procedure 506, the prediction module 326 selects the nodes at the top of the rank, and adds the predicted features to the selected nodes. By adding the feature values to the nodes that do not have that feature, the knowledge graph 332 is more complete.

FIG. 5B schematically depicts method 500B for finding new edges in a knowledge graph according to certain embodiments of the present disclosure, after the MAGNA application 318 is well-trained. In certain embodiments, the method is implemented by the computing device 310, specifically the prediction module 326 shown in FIG. 3A. It should be particularly noted that, unless otherwise stated in the present disclosure, the steps of the training process or method may be arranged in a different sequential order, and are thus not limited to the sequential order as shown in FIG. 5B. Kindly note that the training data of the MAGNA application 318 may be the same knowledge graph 332.

As shown in FIG. 5B, at procedure 426, the procedures 404-420 are performed iteratively to keep updating embeddings of the knowledge graph until a predetermined number of iterations is completed or the parameters of the models converge. Then at procedure 512, after obtaining the updated embedding, the prediction module 326 uses the updated embedding to predict new edges in the knowledge graph 332. For example, when the nodes are customers and products, and edge type of the knowledge graph includes the relation of "interested in," the new edges may link certain customers to certain products, where no link between the customers and the products are available previously.

The probabilities of the predicted edges may vary, and at procedure 514, the prediction module 326 ranks the newly predicted edges based on probabilities or confidence of the new edges.

At procedure 516, the prediction module 326 selects the new edges at the top of the rank, and adds the predicted new edges to the knowledge graph. By adding the new edges that do not exist before, the knowledge graph 332 is more complete.

In certain aspects, the present disclosure provides methods of using the completed knowledge graph. In certain embodiments, the method is credit evaluation, and the method may include: completing the knowledge graph as shown in FIG. 5A using for example credit history of people, where each of a large number of people is a node in the knowledge graph, the edge indicates the connection of the social interactions among people, the labels of the nodes are credit categories (such as bad credit, good credit, excellent credit) or credit scores of the people, and the credit categories assigned to the nodes are accurate because of the application of MAGNA; upon receiving a request for a loan by one person of the people, providing the loan to the person if he has a good or excellent credit, or determining a limit of the loan based on the credit score of the person. In certain embodiments, the method is product recommendation, and the recommendation method may include: completing the knowledge graph as shown in FIG. 5B using for example purchase history of customers, where each of a large number of customers and a large number of products is a node in the knowledge graph, the edges between a customer node and a product node indicating the possibility the customer would like to purchase the product; selecting the products that have strong edge relations to a customer; and sending information of the selected products to the customer. In certain embodiments, the method is friend recommendation, and the recommendation method may include: completing the knowledge edge graph as shown in FIG. 5B using information of a social network, where each of a large number of social network users is a node in the knowledge graph, the edges between a user node and another user node indicating the possibility the users would be friend if they have the opportunity to meet each other; selecting candidate users that have strong edge relations to a target user; and sending information of the candidate users to the target user.

EXPERIMENTS

We evaluate MAGNA on two classical tasks. (1) On node classification we achieve an average of 5:7% relative error reduction; (2) on knowledge graph completion, we achieve 7:1% relative improvement in the Hit at 1 metric. We compare with numbers reported by baseline papers when available.

Task 1: Node Classification.

Datasets. We employ four benchmark datasets for node classification: (1) standard citation network benchmarks Cora, Citeseer and Pubmed; and (2) a benchmark dataset ogbn-arxiv on 170 K nodes and 1.2 M edges from the Open Graph Benchmark. We follow the standard data splits for all datasets.

Baselines. We compare against a comprehensive suite of state-of-the-art GNN methods including: GCNs, Chebyshev filter based GCNs, DualGCN, JKNet, LGCN, Diffusion-GCN, APPNP, Graph U-Nets (g-U-Nets), and GAT.

Experimental Setup. For datasets Cora, Citeseer and Pubmed, we use 6 MAGNA blocks with hidden dimension 512 and 8 attention heads. For the large-scale ogbn-arxiv dataset, we use 2 MAGNA blocks with hidden dimension 128 and 8 attention heads.

Results. We report node classification accuracies on the benchmarks. Results are summarized in Table 1 in FIG. 6 and Table 2 in FIG. 7, where Table 1 shows node classification accuracy on Cora, Citeseer, Pubmed, and Table 2 shows node classification accuracy on OGB Arxiv dataset. MAGNA improves over all methods and achieves the new state-of-the-art on all datasets.

Ablation study. We report in Table 1 the model performance after removing each component of MAGNA (layer normalization, attention diffusion and deep aggregation feed forward layers) from every layer of MAGNA. Note that the model is equivalent to GAT without these three components. We observe that both diffusion and layer normalization play a crucial role in improving the node classification performance for all datasets. While layer normalization alone does not benefit GNNs, its use in conjunction with the attention diffusion module significantly boosts MAGNA's performance. Since MAGNA computes many attention values, layer normalization is crucial in ensuring training stability. Meanwhile, we also remove both layer normalization and deep aggregation feed forward layer, and only keep the attention diffusion layer (see the next-to-last row of Table 1). Comparing to GAT, attention diffusion allows multi-hop attention in each layer still benefits the performance of node classification.

Task 2: Knowledge Graph Completion

Datasets. We evaluate MAGNA on standard benchmark knowledge graphs: WN18RR and FB15K-237.

Baselines. We compare MAGNA with state-of-the-art baselines, including (1) translational distance based models: TransE and its latest extension RotatE, OTE, and ROTH; (2) semantic matching based models: ComplEx, QuatE, CoKE, ConvE, DistMult, and TuckER; (3) GNN-based models: R-GCN, SACN, and A2N.

Training procedure. We use the standard training procedure used in previous KG embedding models. We follow an encoder-decoder framework. The encoder applies the proposed MAGNA model to compute the entity embeddings. The decoder then makes link prediction given the embeddings outputted from the MAGNA, and existing decoders in prior models can be applied. To show the power of MAGNA, we employ the DistMult decoder, a simple decoder without extra parameters.

Evaluation. We use the standard split for the benchmarks, and the standard testing procedure of predicting tail (head) entity given the head (tail) entity and relation type. We exactly follow the evaluation used by all previous works, namely the Mean Reciprocal Rank (MRR), Mean Rank (MR), and hit rate at K (H@K).

Results. MAGNA achieves new state-of-the-art in knowledge graph completion on all four metrics as show in FIG. 8, Table 3. MAGNA compares favorably to both the most recent shallow embedding methods (QuatE), and deep embedding methods (SACN). Note that with the same decoder (DistMult), MAGNA using its own embeddings achieves drastic improvements over using the corresponding DistMult embeddings.

MAGNA Model Analysis

Here we present (1) the spectral analysis results, (2) effect of the hyper-parameters on MAGNA performance, and (3) attention distribution analysis to show the strengths of MAGNA.

Figure 9B:
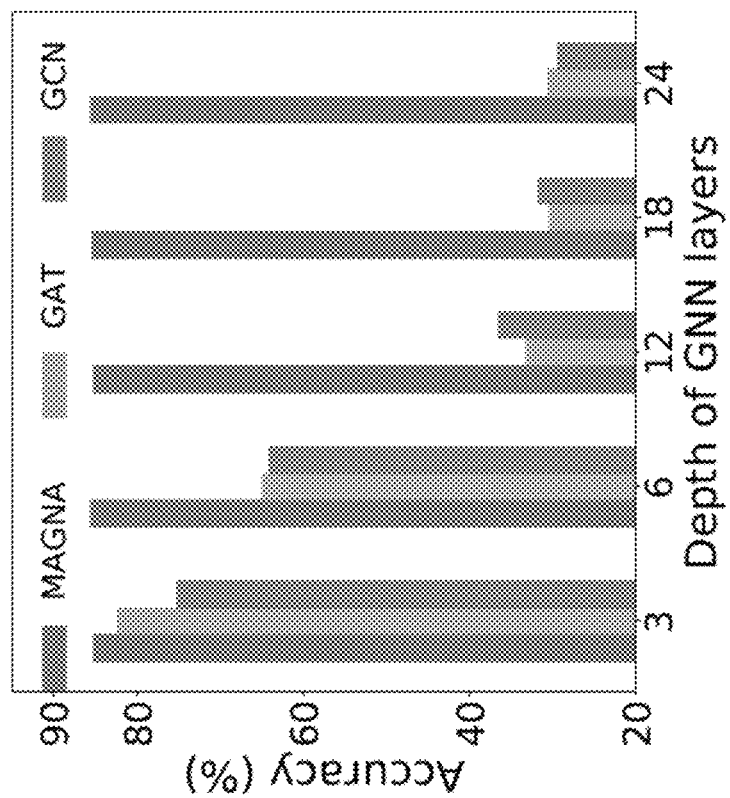
FIG. 9B shows effect of model layer depth on processing Cora dataset using MAGNA and other related methods according to certain embodiments of the present disclosure.
Figure 9A:
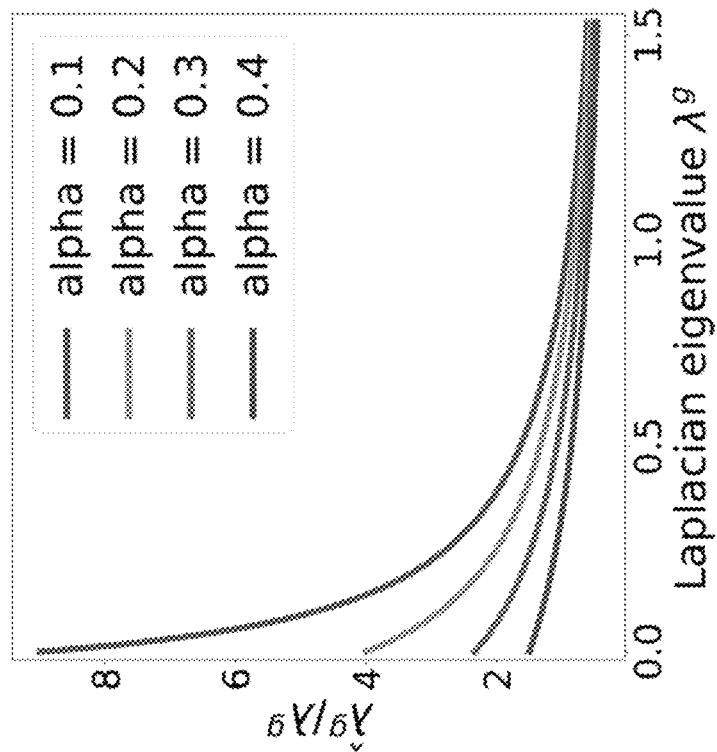
FIG. 9A shows ratio $\hat{\lambda}_i^g/\lambda_i^g$ on processing Cora dataset using MAGNA and other related methods according to certain embodiments of the present disclosure.

Spectral Analysis. Why does MAGNA work for node classification? We compute the eigenvalues of the graph Laplacian of the attention matrix A, $\hat{\lambda}_i^g$, and compare to that of the diffused matrix $\mathcal{A}$, $\lambda_i^g$. FIG. 9A shows the ratio $\hat{\lambda}_i^g/\lambda_i^g$ on the Cora dataset. Low eigenvalues corresponding to largescale structure in the graph are amplified (up to a factor of 8), while high eigenvalues corresponding to eigenvectors with noisy information are suppressed.

MAGNA Model Depth. We conduct experiments by varying the number of GCN, GAT and our MAGNA layers to be 3, 6, 12, 18 and 24 for node classification on Cora. Results in FIG. 9B show that both deep GCN and deep GAT (even with residual connection) suffer from degrading performance, due to the over-smoothing problem. In contrast, the MAGNA model achieves consistent best results even with 18 layers, making deep MAGNA model robust and expressive. Notice that GAT with 18 layers cannot out-perform MAGNA with 3 layers and K=6 hops, although they have the same receptive field.

Figure 9D:
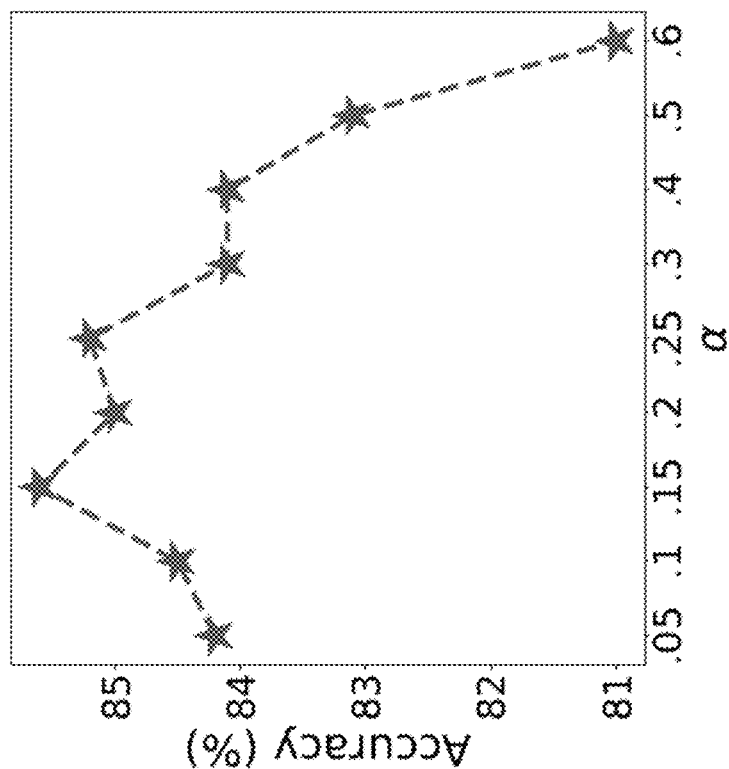
FIG. 9D shows effect of parameter a on processing Cora dataset using MAGNA and other related methods according to certain embodiments of the present disclosure.
Figure 9C:
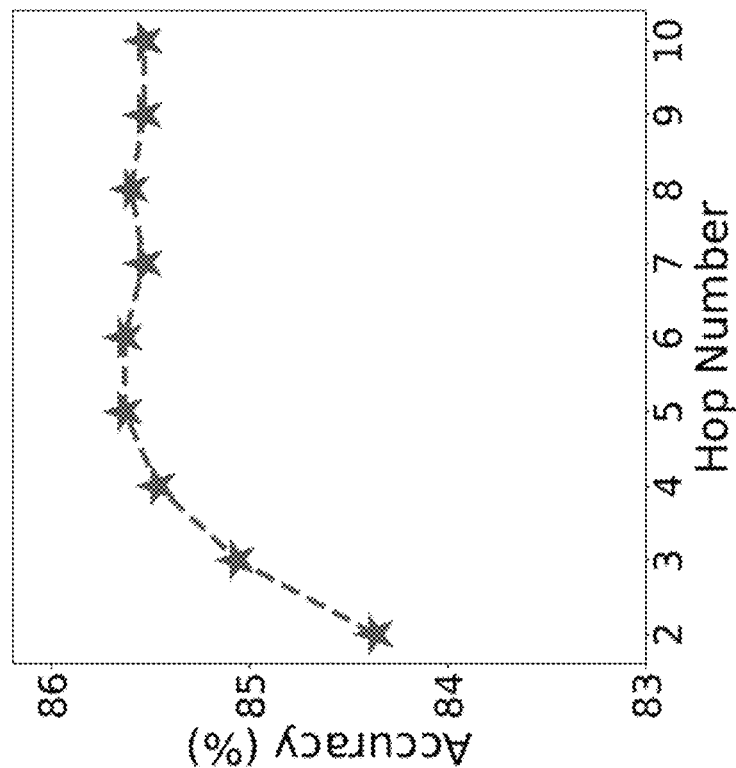
FIG. 9C shows effect of hop number on processing Cora dataset using MAGNA and other related methods according to certain embodiments of the present disclosure.

Effect of K and α. FIG. 9C and FIG. 9D report the effect of hop number K and teleport probability on model performance. We observe significant increase in performance when considering multi-hop neighbors' information (K>1). However, increasing the hop number K has a diminishing returns, for K≥6. Moreover, we find that the optimal K is correlated with the largest node average shortest path distance (e.g., 5.27 for Cora). This provides a guideline for choosing the best K. Here the node average shortest path means the average of the path lengths of a given node to the other nodes.

We also observe that the accuracy drops significantly for larger α>0.25. This is because small α increases the low-pass effect (FIG. 9A). However, α being too small results in the model only focusing on large-scale graph structure and ignores too much high-frequency information.

Attention Distribution. Last we also analyze the learned attention scores of GAT and MAGNA. We first define a discrepancy metric over the attention matrix A for node $v_i$ as $$\Delta_i = \frac{\|A_{(i,j)} - U_i\|}{\text{degree}(v_i)}$$

Figure 10:
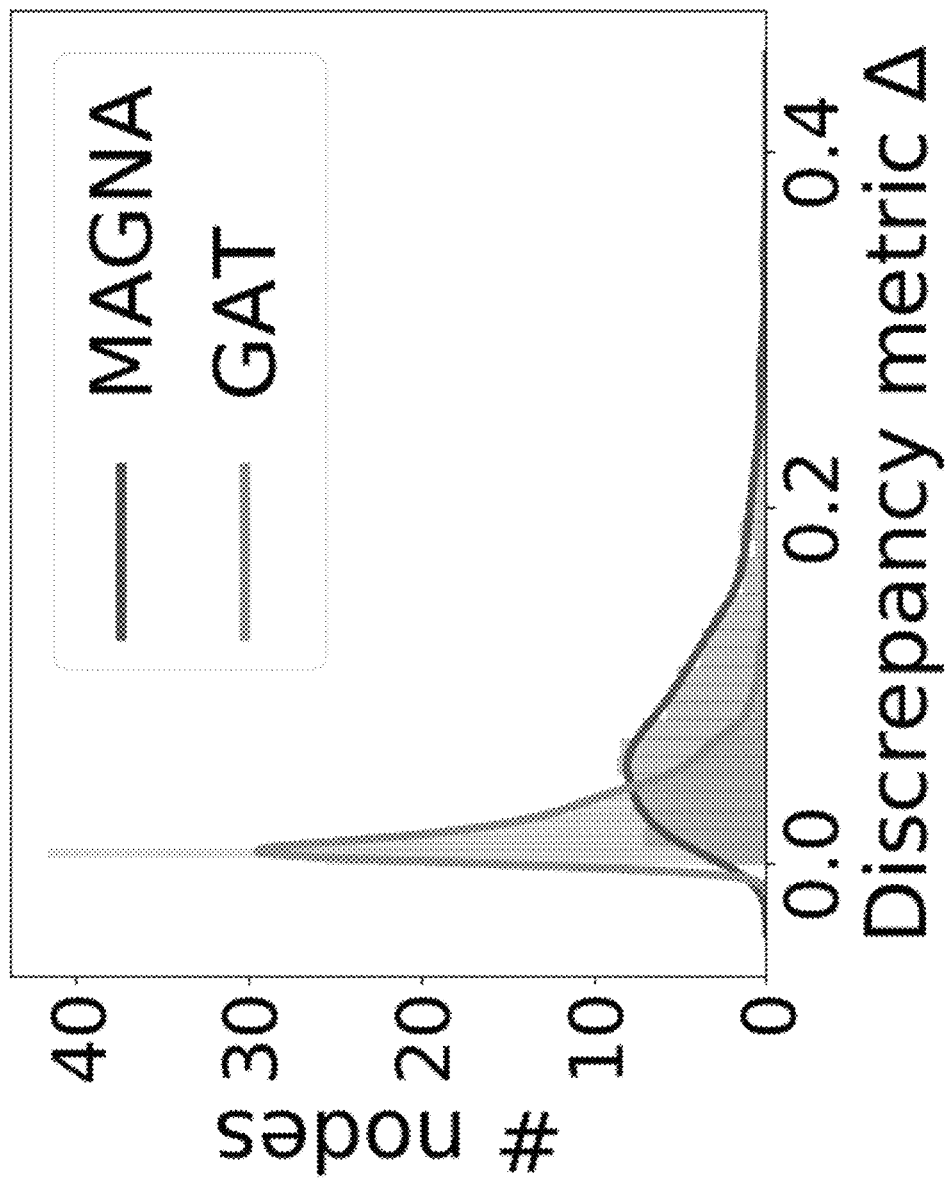
FIG. 10 shows attention weights on Cora dataset according to certain embodiments of the present disclosure.

(Shanthamallu et al., 2020), where $U_i$ is the uniform distribution score for the node $v_i$. $\Delta_i$ gives a measure of how much the learnt attention deviates from a uninformative uniform distribution. Large $\Delta_i$ indicates more meaningful attention scores. FIG. 10 shows the distribution of the discrepancy metric of the attention matrix of the 1st head with regard to the first layer of MAGNA and GAT. It is observed that attention scores learned in MAGNA have much larger discrepancy. This shows that MAGNA is more powerful than GAT in distinguishing important and non-important nodes and assigns attention scores accordingly.

We proposed Multi-hop Attention Graph Neural Network (MAGNA), which brings together benefits of graph attention and diffusion techniques in a single layer through attention diffusion, layer normalization and deep aggregation. MAGNA enables context-dependent attention between any pair of nodes in the graph in a single layer, enhances large-scale structural information, and learns more informative attention distribution. MAGNA improves over all state-of-the-art methods on the standard tasks of node classification and knowledge graph completion.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, the computing device comprising a processor and a storage device storing computer executable code, wherein the computer executable code, when executed at the processor, is configured to:

provide an incomplete knowledge graph comprising a plurality of nodes and a plurality of edges, each of the edges connecting two of the plurality of nodes;

calculate an attention matrix of the incomplete knowledge graph based on one-hop attention between any two of the plurality of the nodes that are connected by one of the plurality of the edges;

calculate multi-head diffusion attention for any two of the plurality of nodes from the attention matrix;

obtain an updated embedding of the incomplete knowledge graph using the multi-head diffusion attention, and train a neural network model based on the updated embedding and labels of the incomplete knowledge graph, to obtain a trained neural network model; and update the incomplete knowledge graph to obtain updated knowledge graph by using the trained neural network model, wherein the computer executable code is configured to calculate the attention matrix by: calculating an attention score $s_{i,k,j}^{(l)}$ for an edge $(v_i, r_k, v_j)$ by $s_{i,k,j}^{(l)}=$ LeakyReLU $(v_\alpha^{(l)} \tan h(W_h^{(l)}h_i^{(l)}\|W_t^{(l)}h_j^{(l)}\|W_r^{(l)}r_k))$ (equation (1), wherein $v_i$ and $v_j$ are nodes i and j, $r_k$ is a type of the edge between the nodes i and j, $W_h^{(l)} \in \mathbb{R}^{d^{(l)} \times d^{(l)}}$, $W_t^{(l)} \in \mathbb{R}^{d^{(l)} \times d^{(l)}}$, $W_r^{(l)} \in \mathbb{R}^{d^{(l)} \times d_r}$ and $v_\alpha^{(l)} \in \mathbb{R}^{1 \times 3d^{(l)}}$ are trainable weights shared by an l-th layer of the multi-head attention, $h_i^{(l)} \in \mathbb{R}^{d^{(l)}}$ represents embedding of the node i at the l-th layer, $h_j^{(l)} \in \mathbb{R}^{d^{(l)}}$ represents embedding of the node j at the l-th layer, $r_k$ is trainable relation embedding of a k-th relation type, and $\|$ denotes concatenation of embedding vectors;

obtaining attention score matrix $S^{(l)}$ by:

$$S_{i,j}^{(l)} = \begin{cases} s_{i,k,j}^{(l)}, & \text{if } (v_i, r_k, v_j) \text{ appears in } \mathcal{G} \\ -\infty, & \text{otherwise} \end{cases} \quad \text{(equation (2))}$$

wherein G is the knowledge graph; and
calculating the attention matrix $A^{(l)}$ by: $A^{(l)}=\text{softmax}(S^{(l)})$.

2. The system of claim 1, wherein the computer executable code is configured to calculate the multi-head diffusion attention by:
calculating multi-hop attention matrix A by: $A=\Sigma_{hop=0}^{\infty} \theta_{hop} A^{hop}$ (equation (3)), wherein hop is a positive integer in a range of 2-20, and $\theta_{hop}$ is an attention decay factor; and
calculating the multi-head diffusion attention by: AttDiffusion $(G, H^{(l)}, \Theta)=AH^{(l)}$ (equation (4)), wherein $\Theta$ represents parameters for equation (1), and $H^{(l)}$ is input entity embedding of the l-th layer.

3. The system of claim 2, wherein the $AH^{(l)}$ is approximated by:
letting $Z^{(0)}=H^{(l)}$, $Z^{(k+1)}=(1-\alpha)AZ^{(k)}+\alpha Z^{(0)}$ (equation (5)), wherein $0 \leq k \leq K$, and $\theta_{hop}=\alpha(1-\alpha)^{hop}$; and
defining the $AH^{(l)}$ as $Z^{(K)}$.

4. The system of claim 3, wherein the hop or K is a positive integer in a range of 2-12, and l is a positive integer in a range of 2-24.

5. The system of claim 4, wherein the computer executable code is configured to obtain the updated embedding of the incomplete knowledge graph by: performing sequentially a first layer normalization and addition, a feed forward, and a second layer normalization and addition on the multi-head diffusion attention.

6. The system of claim 5, wherein the feed forward is performed using a two-layer multilayer perceptron (MLP) network.

7. The system of claim 1, wherein the computer executable code is further configured to, after obtaining the updated embedding: calculate a loss function based on the updated embedding and labels of the nodes and edges of the incomplete knowledge, and adjust parameters for calculating the attention matrix, calculating the multi-head diffusion attention, and obtaining the updated embedding.

8. The system of claim 7, wherein the computer executable code is configured to perform the steps of calculating the attention matrix, calculating the multi-head attention diffusion, obtaining the updated embedding, calculating the loss function, and adjusting the parameters iteratively for a plurality of times, and update the incomplete knowledge graph using the updated embedding obtained after the plurality of times of iterations.

9. The system of claim 8, wherein the computer executable code is configured to update the incomplete knowledge graph by: predict new feature of the plurality of the nodes or predict new edges based on the updated embedding, and adding the new features to the nodes or adding the new edges to the incomplete knowledge graph.

10. The system of claim 1, wherein the computer executable code is further configured to, when the updated knowledge graph comprises a plurality of consumers and a plurality of products: recommend a product to a consumer when the product and the consumer is linked by an edge in the updated knowledge graph, and the edge indicates interest of the consumer to the product.

11. The system of claim 1, wherein the computer executable code is further configured to, when the updated knowledge graph comprises a plurality of customers: provide credit scores for the plurality of customers based on features of the customers in the knowledge graph.

12. A method comprising:
providing, by a computing device, an incomplete knowledge graph comprising a plurality of nodes and a plurality of edges, each of the edges connecting two of the plurality of nodes;
calculating, by the computing device, an attention matrix of the incomplete knowledge graph based on one-hop attention between any two of the plurality of the nodes that are connected by one of the plurality of the edges;
calculating, by the computing device, multi-head diffusion attention for any two of the plurality of nodes from the attention matrix;
obtaining, by the computing device, an updated embedding of the incomplete knowledge graph using the multi-head diffusion attention, and training a neural network model based on the updated embedding and labels of the incomplete knowledge graph, to obtain a trained neural network model; and
updating, by the computing device, the incomplete knowledge graph to obtain updated knowledge graph by using the trained neural network model,
wherein the step of calculating the attention matrix comprises:
calculating an attention score $s_{i,k,j}^{(l)}$ for an edge $(v_i, r_k, v_j)$ by $s_{i,k,j}^{(l)}=\text{LeakyReLU}(v_\alpha^{(l)} \tan h(W_h^{(l)}h_i^{(l)}\|W_t^{(l)}h_j^{(l)}\|W_r^{(l)}r_k))$ (equation (1)), wherein $v_i$ and $v_j$ are nodes i and j, $r_k$ is a type of the edge between the nodes i and j, $W_h^{(l)} \in \mathbb{R}^{d^{(l)} \times d^{(l)}}$, $W_t^{(l)} \in \mathbb{R}^{d^{(l)} \times d^{(l)}}$, $W_r^{(l)} \in \mathbb{R}^{d^{(l)} \times d_r}$ and $v_\alpha^{(l)} \in \mathbb{R}^{1 \times 3d^{(l)}}$ are trainable weights shared by an l-th layer of the multi-head attention, $h_i^{(l)} \in \mathbb{R}^{d^{(l)}}$ represents embedding of the node i at the l-th layer, $h_j^{(l)} \in \mathbb{R}^{d^{(l)}}$ represents embedding of the node j at the l-th layer, $r_k$ is trainable relation embedding of a k-th relation type, and $\|$ denotes concatenation of embedding vectors;
obtaining attention score matrix $S^{(l)}$ by:

$$S_{i,j}^{(l)} = \begin{cases} s_{i,k,j}^{(l)}, & \text{if } (v_i, r_k, v_j) \text{ appears in } \mathcal{G} \\ -\infty, & \text{otherwise} \end{cases} \quad \text{(equation (2))}$$

wherein G is the knowledge graph; and
calculating the attention matrix $A^{(l)}$ by: $A^{(l)}=\text{softmax}(S^{(l)})$.

13. The method of claim 12, wherein the step of calculating the multi-head diffusion attention comprises:
calculating multi-hop attention matrix A by: $A=\Sigma_{hop=0}^{\infty} \theta_{hop} A^{hop}$ (equation (3)), wherein hop is a positive integer in a range of 2-20, and $\theta_{hop}$ is an attention decay factor; and calculating the multi-head diffusion attention by: AttDiffusion $(G, H^{(l)}, \Theta)=AH^{(l)}$ (equation (4)), wherein $\Theta$ represents parameters for equation (1), and $H^{(l)}$ is input entity embedding of the l-th layer.

14. The method of claim 13, wherein the $AH^{(l)}$ is approximated by:
   letting $Z^{(0)}=H^{(l)}$, $Z^{(k+1)}=(1-\alpha)AZ^{(k)}+\alpha Z^{(0)}$ (equation (5)), wherein $0 \leq k \leq K$, and $\theta_{hop}=\alpha(1-\alpha)^{hop}$; and
   defining the $AH^{(l)}$ as $Z^{(K)}$.

15. The method of claim 14, wherein the hop or K is a positive integer in a range of 2-12, and l is a positive integer in a range of 2-24.

16. The method of claim 15, wherein the computer executable code is configured to obtain the updated embedding of the incomplete knowledge graph by: performing sequentially a first layer normalization and addition, a feed forward, and a second layer normalization and addition on the multi-head diffusion attention.

17. A non-transitory computer readable medium storing computer executable code, wherein the computer executable code, when executed at a processor of an active computing device, is configured to:
   provide an incomplete knowledge graph comprising a plurality of nodes and a plurality of edges, each of the edges connecting two of the plurality of nodes;
   calculate an attention matrix of the incomplete knowledge graph based on one-hop attention between any two of the plurality of nodes that are connected by one of the plurality of edges;
   calculate multi-head diffusion attention for any two of the plurality of nodes from the attention matrix;
   obtain an updated embedding of the incomplete knowledge graph using the multi-head diffusion attention, and train a neural network model based on the updated embedding and labels of the incomplete knowledge graph, to obtain a trained neural network model; and
   update the incomplete knowledge graph to obtain updated knowledge graph by using the trained neural network model wherein the computer executable code is configured to:
   calculate the attention matrix by:
      calculating an attention score $s_{i,k,j}^{(l)}$ for an edge $(v_i, r_k, v_j)$ by $s_{i,k,j}^{(l)}=\text{LeakyReLU}(v_\alpha^{(l)} \tan h(W_h^{(l)} h_i^{(l)} \| W_t^{(l)} h_j^{(l)} \| W_r^{(l)} r_k))$ (equation (1), wherein $v_i$ and $v_j$ are nodes i and j, $r_k$ is a type of the edge between the nodes i and j, $W_h^{(l)} \in \mathbb{R}^{d^{(l)} \times d^{(l)}}$, $W_t^{(l)} \in \mathbb{R}^{d^{(l)} \times d^{(l)}}$, $W_r^{(l)} \in \mathbb{R}^{d^{(l)} \times d_r}$ and $v_\alpha^{(l)} \in \mathbb{R}^{1 \times 3d^{(l)}}$ are trainable weights shared by an l-th layer of the multi-head attention, $h_i^{(l)} \in \mathbb{R}^{d^{(l)}}$ represents embedding of the node i at the l-th layer, $h_j^{(l)} \in \mathbb{R}^{d^{(l)}}$ represents embedding of the node i at the l-th layer, $r_k$ is trainable relation embedding of a k-th relation type, and $\|$ denotes concatenation of embedding vectors;
   obtaining attention score matrix $S^{(l)}$ by:

$$S_{i,j}^{(l)} = \begin{cases} s_{i,k,j}^{(l)}, & \text{if } (v_i, r_k, v_j) \text{ appears in } \mathcal{G} \\ -\infty, & \text{otherwise} \end{cases} \quad \text{(equation (2))}$$

wherein G is the knowledge graph; and
   calculating the attention matrix $A^{(l)}$ by: $A^{(l)}=\text{softmax}(S^{(l)})$; and
   calculate the multi-head diffusion attention by:
      calculating multi-hop attention matrix A by: $A=\Sigma_{hop>0}^{\infty} \theta_{hop} A^{hop}$ (equation (3)), wherein hop is a positive integer in a range of 2-20, and $\theta_{hop}$ is an attention decay factor; and
   calculating the multi-head diffusion attention by: AttDiffusion $(G, H^{(l)}, \Theta)=AH^{(l)}$ (equation (4)), wherein $\Theta$ represents parameters for equation (1), and $H^{(l)}$ is input entity embedding of the l-th layer.

\* \* \* \* \*